United States Patent
Ström et al.

(10) Patent No.: US 7,751,630 B2
(45) Date of Patent: Jul. 6, 2010

(54) MULTI-MODE IMAGE PROCESSING

(75) Inventors: Jacob Ström, Stockholm (SE); Tomas Akenine-Möller, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 812 days.

(21) Appl. No.: 11/571,806

(22) PCT Filed: Jul. 1, 2005

(86) PCT No.: PCT/SE2005/001070

§ 371 (c)(1),
(2), (4) Date: Feb. 15, 2007

(87) PCT Pub. No.: WO2006/006915

PCT Pub. Date: Jan. 19, 2006

(65) Prior Publication Data

US 2008/0310740 A1    Dec. 18, 2008

(30) Foreign Application Priority Data

Jul. 8, 2004    (SE)    .................................... 0401851
May 27, 2005    (SE)    .................................... 0501260

(51) Int. Cl.
*G06K 9/36*    (2006.01)
(52) U.S. Cl. .................................................... 382/232

(58) Field of Classification Search ................. 382/166, 382/232–253, 100; 375/240.01–240.26; 358/426.01–426.16, 539
See application file for complete search history.

(56) References Cited

U.S. PATENT DOCUMENTS

| 5,682,249 | A | | 10/1997 | Harrington et al. | |
|---|---|---|---|---|---|
| 5,956,431 | A | * | 9/1999 | Iourcha et al. | 382/253 |
| 7,003,167 | B2 | * | 2/2006 | Mukherjee | 382/239 |
| 7,366,319 | B2 | * | 4/2008 | Andrew et al. | 382/100 |
| 7,657,105 | B2 | * | 2/2010 | Strom | 382/232 |

\* cited by examiner

*Primary Examiner*—Sherali Ishrat
(74) *Attorney, Agent, or Firm*—Michael G. Cameron

(57) ABSTRACT

The invention is applied to image processing schemes by providing at least one auxiliary block processing mode in addition to the standard default block processing mode of the scheme. An image to be decoded is divided into a number of image blocks (800) having multiple image elements (810). These blocks (800) are individually compressed by means of a default compressing mode or an auxiliary compressing mode, depending on which mode that results in a smallest error metric. A portion (980) of the resulting compressed block (900) is used to discriminate between the two modes. In the auxiliary mode, the remaining payload portion (990) of the compressed block (900) can be used for encoding purposes, whereas the default mode can in addition utilize the discriminating portion (980).

44 Claims, 17 Drawing Sheets

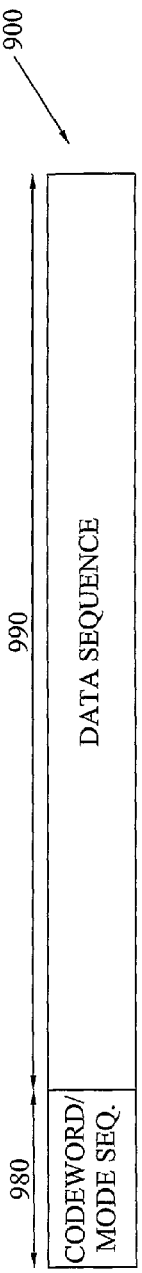
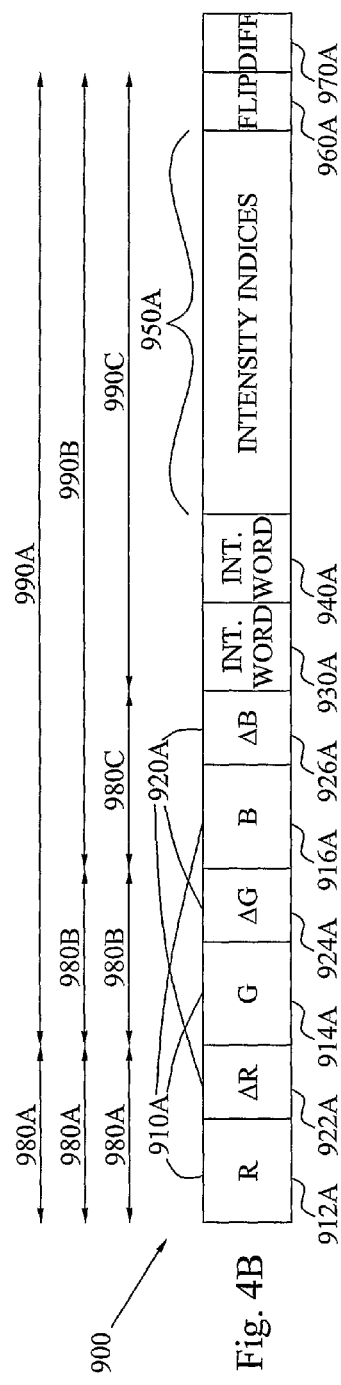
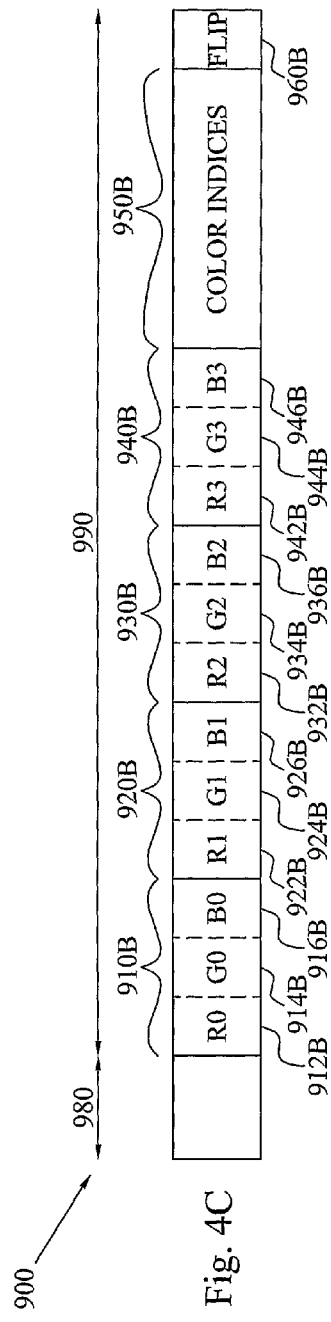
Fig. 4A
Fig. 4B
Fig. 4C

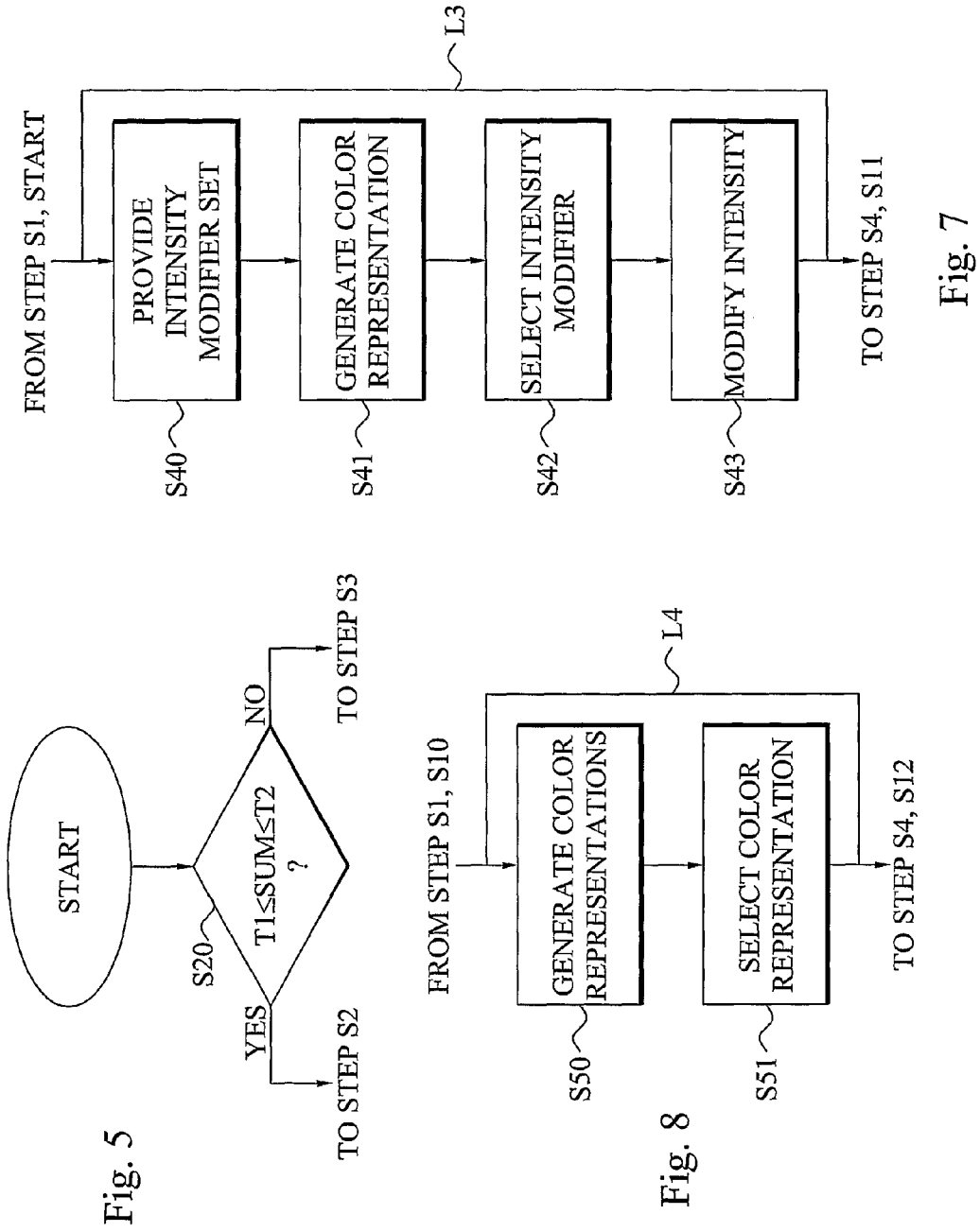

MULTI-MODE IMAGE PROCESSING

CROSS REFERENCE TO RELATED APPLICATIONS

This application is a 371 of PCT/SE 2005/001070 filed on Jul. 1, 2005.

TECHNICAL FIELD

The present invention generally relates to image processing schemes, and in particular to methods and systems for providing additional auxiliary block compressing and decompressing opportunities for such image processing schemes.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering.

DESCRIPTION OF RELATED ART

Delp and Mitchell [1] developed a simple scheme, called block truncation coding (BTC) for image compression. Even though their applications were not texture compression per se, several of the other schemes described in this section are based on their ideas. Their scheme compressed gray scale images by considering a block of 4×4 pixels at a time. For such a block, two 8-bit gray scale values were stored, and each pixel in the block then used a single bit to index to one of these gray scales. This resulted in 2 bits per pixel (bpp).

A simple extension, called color cell compression (CCC), of BTC was presented by Campbell et al. [2]. Instead of using an 8-bit gray scale value, the 8-bit value is employed as an index into a color palette. This allows for compression of colored textures at 2 bpp. However, a memory lookup in the palette is required, and the palette is restricted in size.

The S3TC texture compression method by Iourcha et al. [3] is probably the most popular scheme. It is used in DirectX [4] and there are extensions for it in OpenGL as well. Their work can be seen as a further extension of CCC. The block size for S3TC is 4×4 pixels that are compressed into 64 bits. Two base colors are stored in each 16 bits, and each pixel stores a two-bit index into a local color set that consists of the two base colors and two additional colors in-between the base colors. This means that all colors lie on a line in RGB space. S3TC's compression rate is 4 bpp. One disadvantage of S3TC is that only four colors can be used per block.

Akenine-Möller and Ström present a variation of the S3TC scheme that compresses a 3×2 block into 32 bits [5]. This scheme, called POOMA, is targeted for mobile phones as well. The major difference is that each base color uses fewer bits, and that only one in-between color is used. Also, note that the block width is three, which is awkward for hardware implementations.

A radically different approach is taken by Fenney [6]. Two low-resolution images derived from the original texture are stored, and during decompression, a (local) bilinear magnification of those textures is created, and to create the final color of the texel, a linear blend is done between the two. Two modes are described that give 4 bpp and 2 bpp, respectively. In the 4 bpp version, two base colors are stored per 4×4 block, together with modulation data. To do the bilinear magnification, the neighboring 2×2 blocks are needed. Once these are in the texture cache, decompression should be fast.

In the prior art texture processing (compression and decompression) schemes, including the schemes described above, there is always a desire to exploit the bits (used to encode a block of pixels or image elements) as well as possible. The reason for this is that higher image quality can be the result of better usage of the information. Since all texture processing schemes (in this context) are lossy, it is of uttermost importance to provide as good quality as possible.

SUMMARY

The prior art processing schemes do not exploit the bits used for the compressed representation of image blocks and images fully. As a consequence, there are often certain bit combinations that does not represent any meaningful image blocks. Furthermore, there may be unnecessary redundancy in the compressed image block representations, implying that one and the same image block can be represented by multiple different compressed representations and bit combinations.

The present invention overcomes these and other drawbacks of the prior art arrangements.

It is a general object of the present invention to provide an image processing scheme having a default image processing mode and at least one auxiliary image processing mode.

It is another object of the invention to provide an improved exploitation of image processing schemes by introducing auxiliary processing modes that employ non-utilized bit combinations of the image processing schemes.

Yet another object of the invention is to complement an existing default image processing mode with an auxiliary image processing mode adapted for image blocks that the default processing mode handles poorly.

These and other objects are met by the invention as defined by the accompanying patent claims.

Briefly, the present invention involves complementing a default processing mode of an image processing scheme with at least one additional or auxiliary processing mode. Thus, the present invention identifies certain bit combinations of compressed image block representations that are not employed according to the default processing mode or are meaningless for that default processing mode. These identified bit combinations are then used by at least one auxiliary processing mode that provides a different image (block) processing compared to the default processing mode. This at least one auxiliary processing mode, thus, complements the default processing mode by managing those image blocks that the default processing mode handles poorly. As a consequence, the image quality of the image processing scheme will be improved without increasing the bit rate by using all bit combinations.

According to the invention, an image to be encoded is typically decomposed into a number of image blocks comprising multiple image elements (pixels or texture elements, texels), e.g. $2^m \times 2^n$ or $2^m \times 2^n \times 2^p$ image elements, where m, n, p independently is zero or a positive integer. In an embodiment, the image blocks are then encoded according to a default compressing mode and an auxiliary compressing mode. Thus, for each image block at least two compressed representations of the block are generated, one according to the default mode and one according to the auxiliary mode. A respective error metric is estimated for the two different compressed block representations, where the error metric is indicative of an image quality representation associated with compressing the image block according to the default or auxiliary compressing mode. The compressed block having the smallest associated error metric is selected and used as the compressed representation of the image block.

In an alternative embodiment, the properties of the image elements of an image block are first investigated in order to determine whether the default or auxiliary compressing mode is most suitable to use for the current block. In this embodiment, only a single compressed representation of the block has to be generated using the default or auxiliary mode. In addition, no error metrics have to be estimated.

The default compressing mode generates a compressed block that comprises a default payload portion that is the portion of the compressed block sequence that is actually employed for encoding and representing the block. In most applications, the default payload portion is equal to the whole compressed block sequence, but could alternatively be a subsequence thereof. In contrary to the default mode, the auxiliary compressing mode generates a compressed block that comprises an auxiliary payload portion and a selection portion. As a consequence, the payload portion used for encoding and representing the block in the auxiliary mode will be smaller than the default payload portion of the default mode. However, even if fewer bits can be employed for actual block coding purposes in the auxiliary mode, this auxiliary mode will compress certain image block types better (from an image quality point of view) than the default mode. Note, though, that a majority of the image blocks of an image will typically be encoded by the standard default mode of the image processing scheme and only those (few) blocks that this default mode handles poorly will be encoded according to the auxiliary mode.

The selection portion is the portion of the compressed block that is employed for discriminating between the two modes. In the default mode, the entire selection portion can be used for actually encoding the block and, thus, is a part of the default payload portion. However, in the auxiliary mode, at least a portion of this selection portion has a dedicated discriminating purpose and cannot be used for block encoding. This means that in some applications the selection portion has only discriminating function and the auxiliary payload portion is limited to at most the rest of the compressed block representation. In other applications, a sub-portion of the selection portion can actually be employed for encoding purposes, i.e. having both discriminating and encoding function. In such a case, the remaining sub-portion of the selection portion only has discriminating function.

In either case, a sub-set of the bit combinations of this selection portion signals that the block has been compressed according to the auxiliary compressing mode, whereas the remaining bit combinations then signal that the block was compressed according to the default mode.

In a preferred implementation of the invention, the selection portion represents, when processed according to the default mode, a first and a second codeword, or a (sub-) sequence of the first and second codeword. These codewords represent the same property of the image elements in the block. For example, the two codewords could be two color codewords or two color component codewords. In the former case, the selection portion signals the auxiliary mode when the two codewords are equal otherwise the default mode is employed. In the case with two color component codewords, the default mode is employed when the sum of the two component codewords is within an allowed property, otherwise (being outside of or exceeding the property interval) the auxiliary mode is employed.

When processing or decompressing a compressed image block, the selection portion of the compressed block can be investigated in order to determine whether the default or auxiliary processing mode should be employed. The compressed block is then decompressed according to the selected mode. Alternatively, the compressed block is first decompressed according to the default processing mode and the auxiliary processing mode. The selection portion is then investigated in order to determine which of these two decompressed representations of the image block that will be used.

In the case the mode selection is based on at least two (color) components, multiple auxiliary modes could be used. For example, if the compressed representation as encoded by the default mode comprises two red, green, blue (RGB) color codewords, different auxiliary modes can be employed depending on whether the sum of one, two or three color components (red, green, blue) are outside of the property interval.

The present invention can be implemented with different image processing schemes, e.g. BTC [1], CCC [2], S3TC [3] and POOMA [5], which all utilize two grey-scale or color codewords (C0 and C1) for each image block, and the image elements of the block are associated with color indices into either of these two colors, or into some other colors derived from these two colors. A decompressed representation of an image block based on compressed representation, in which C0=C1=X, will be identical to a compressed representation, in which C1≠C0=X and all indices point to the color codeword C0.

Thus, storing the same color representation in both color C0 and color C1 does not provide any colors that cannot be encoded in other ways. Then it does not really matter which color index that is used for each image element, because each image element can only be of color C0 (which is the same as C1). Then you can instead set C1 to some other color than C0, and let each color index point to C0. The so-obtained compressed image block can then be processed (decompressed) as normal, i.e. utilizing the default processing mode.

This means that bit combinations where C0=C1 are useless, since every such image block can instead be encoded by the "default" way. This opens up an opportunity to utilize the compressed image block representations for which C0=C1 for performing the auxiliary processing mode. Thus, for these processing schemes, the respective normal default processing mode will be employed if the two color codewords are different, whereas a compressed image block having identical color codewords is processed according to an auxiliary processing mode. The selection portion could include the two (color or grey-scale) codewords.

The present invention can also be applied to the image processing scheme denoted iPackman that is an extension of the iPackman scheme [8-10]. iPackman utilizes a color codeword and a differential color codeword. The image block is divided into two sub-blocks, where the first sub-block has a base color generated based on the color codeword and the base color of the second sub-block is generated based on the sum of the color codeword and the differential codeword. However, the sum of the respective (RGB) color components may only be within the interval $[T_1, T_2]$, e.g. $[0, 31]$. Thus, for those bit combinations, in which the sum for at least one color component exceeds that interval (smaller than $T_1$ or larger than $T_2$), the auxiliary mode can be employed, otherwise the default mode will be used.

The invention offers the following advantages:
  Improves existing image processing scheme by providing an opportunity to complement the processing scheme with additional image encoding and decoding modes that complement the default encoding and decoding modes of the processing scheme;
  Increases the quality of a processed image by providing auxiliary modes that manages image blocks that the default modes handle poorly;
  Provides a better utilization of the bit combinations employed for representing image blocks; and
  Only utilizes bit combinations that are not used by the default modes, which allows an improved image processing without sacrificing the operation of the default modes.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

Figure 1:
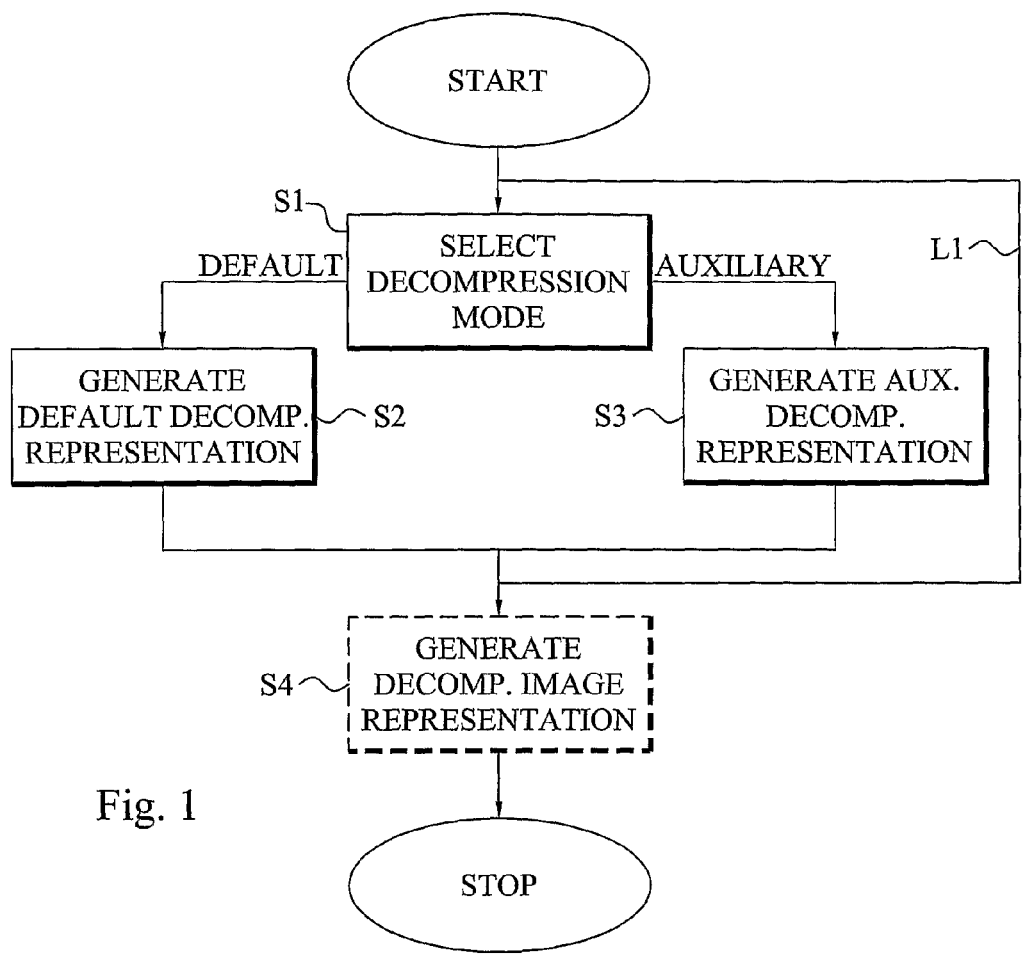
FIG. 1 is a flow diagram illustrating an embodiment of processing a compressed representation of an image block according to the present invention.
Figure 3:
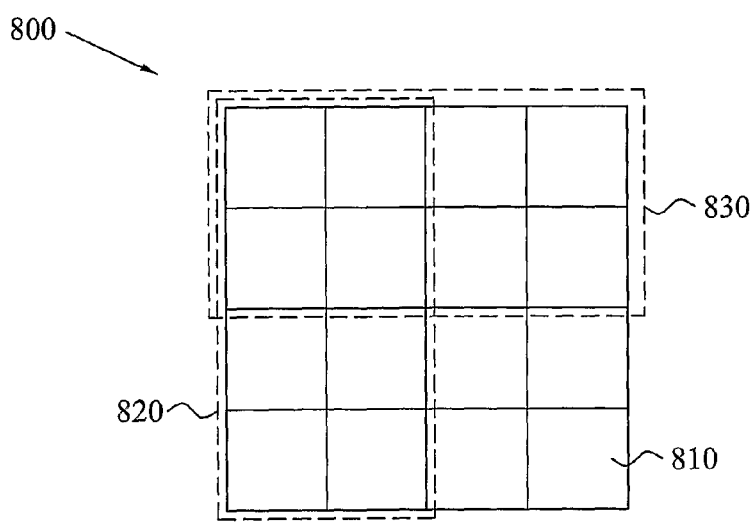
Figure 6:
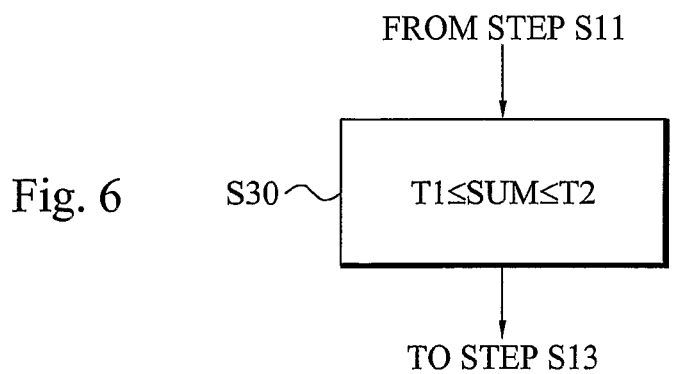
Figure 9A:
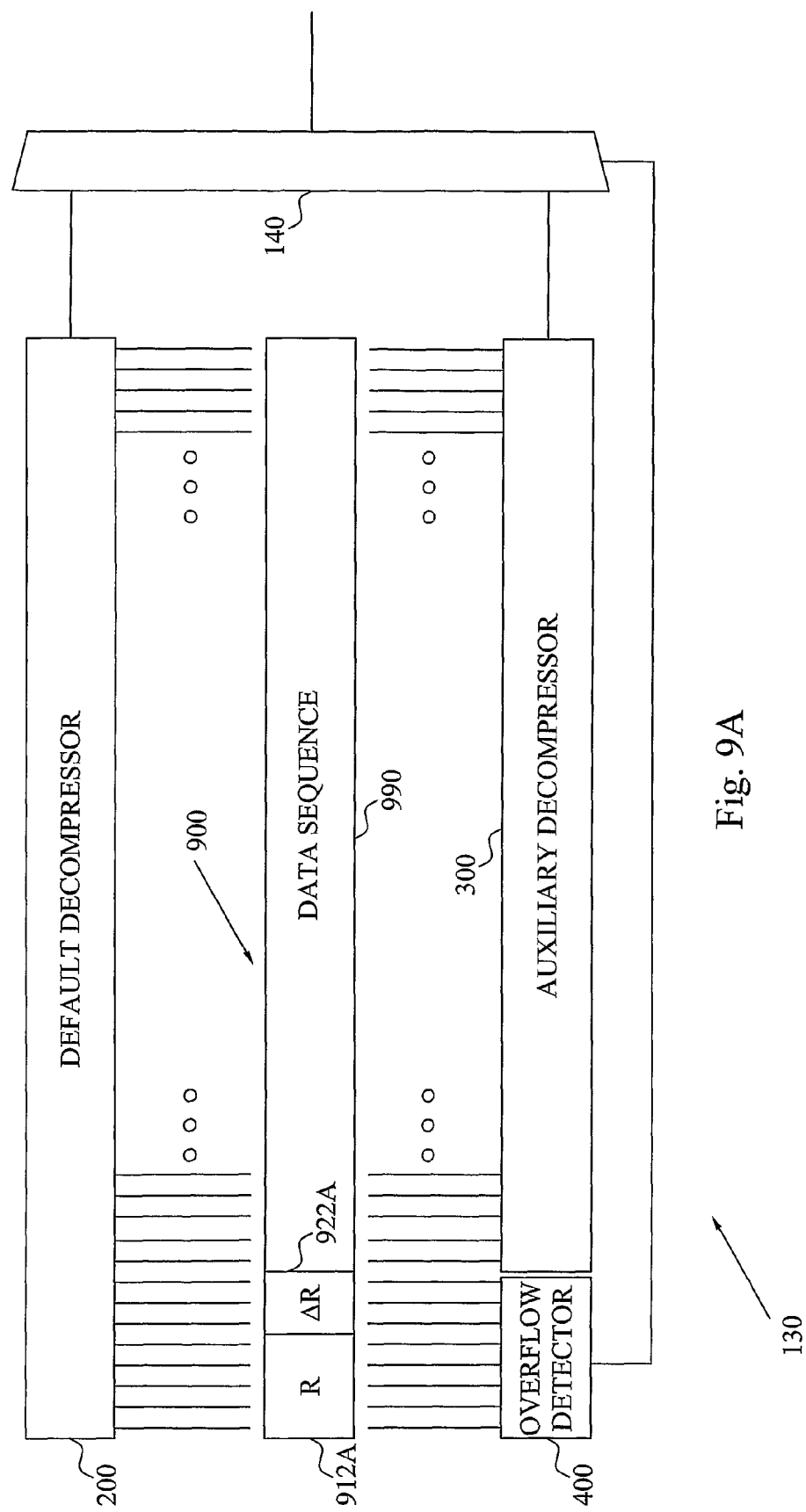
Figure 9B:
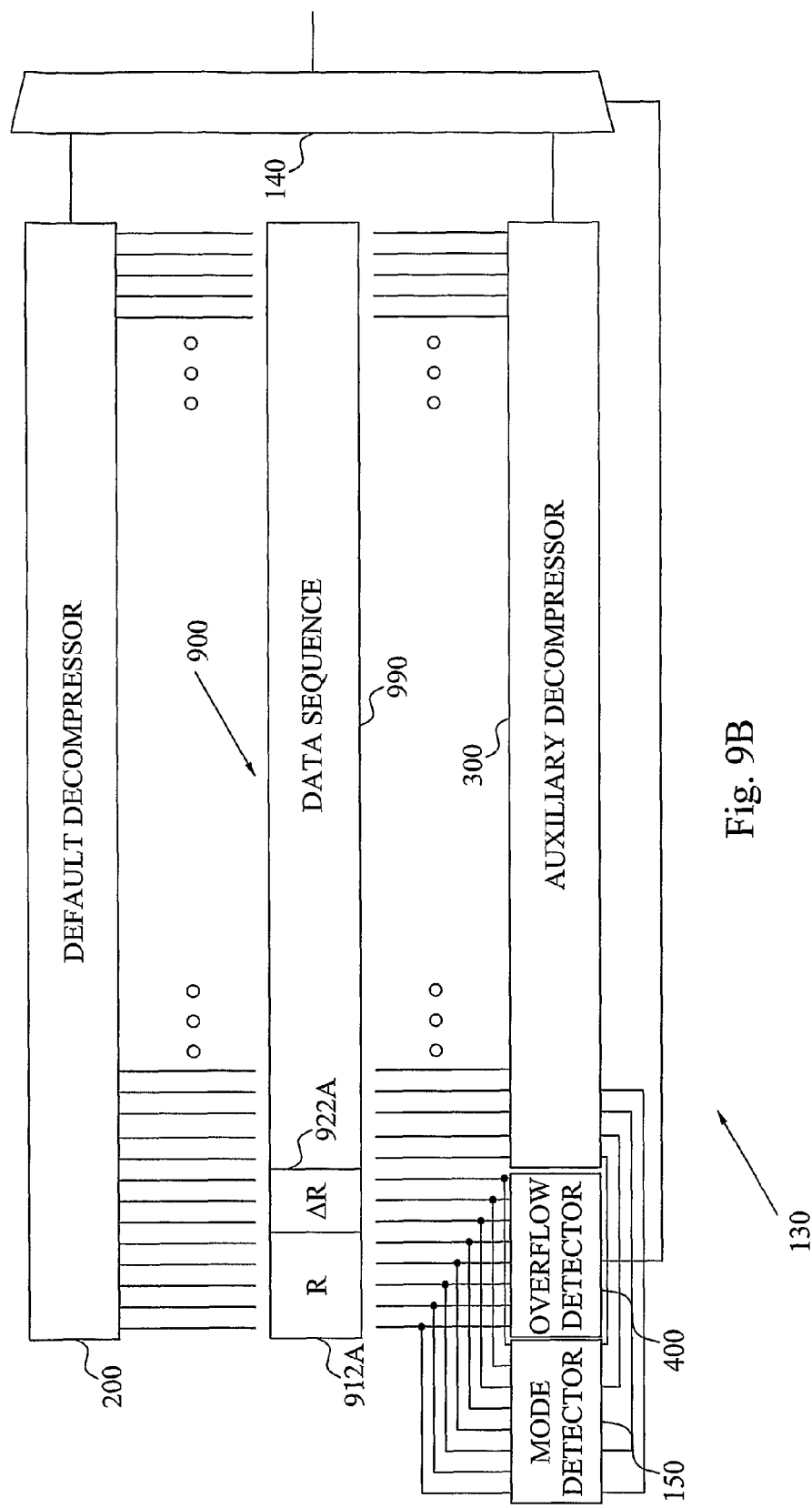
Figure 9C:
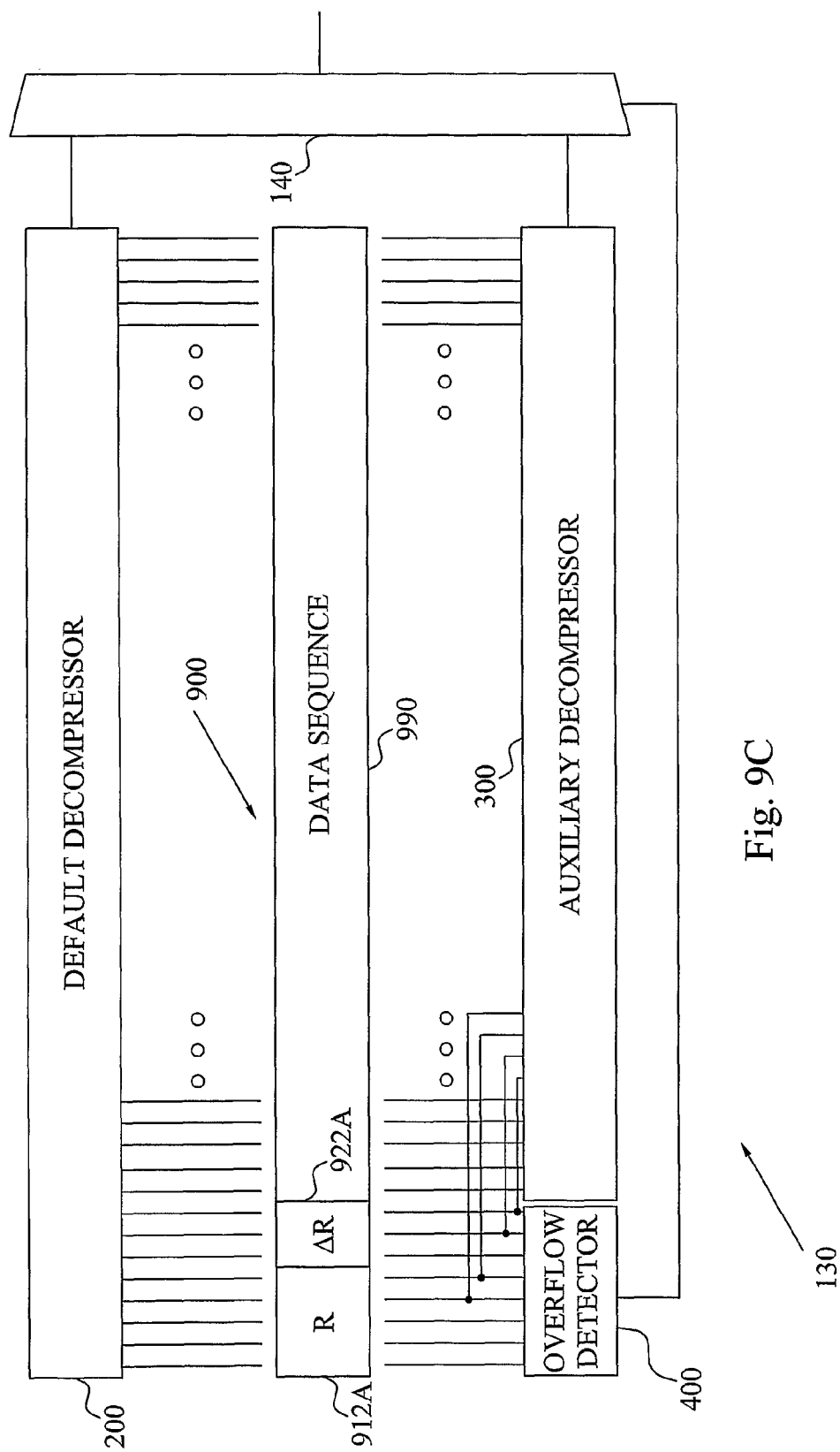
Figure 10A:
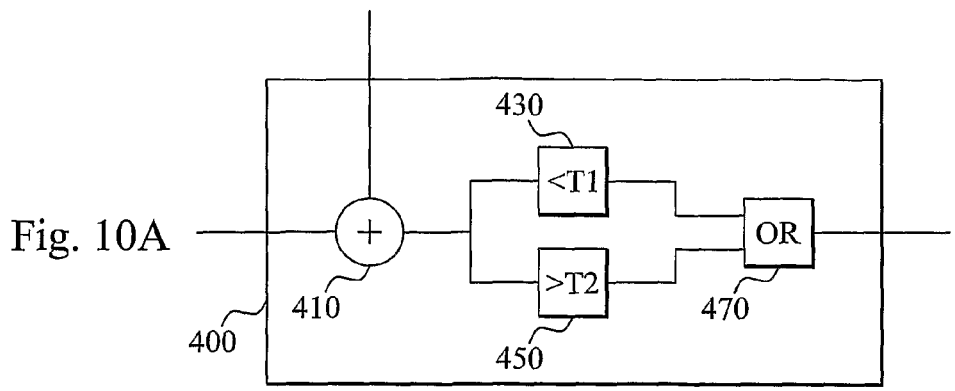
Figure 10B:
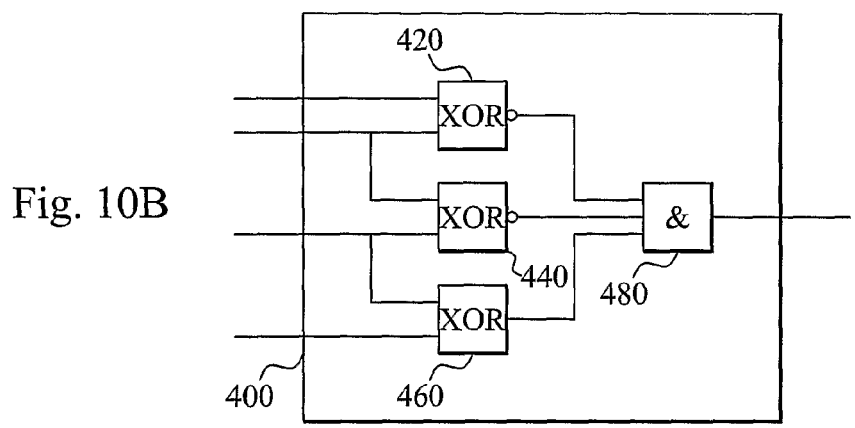
Figure 12:
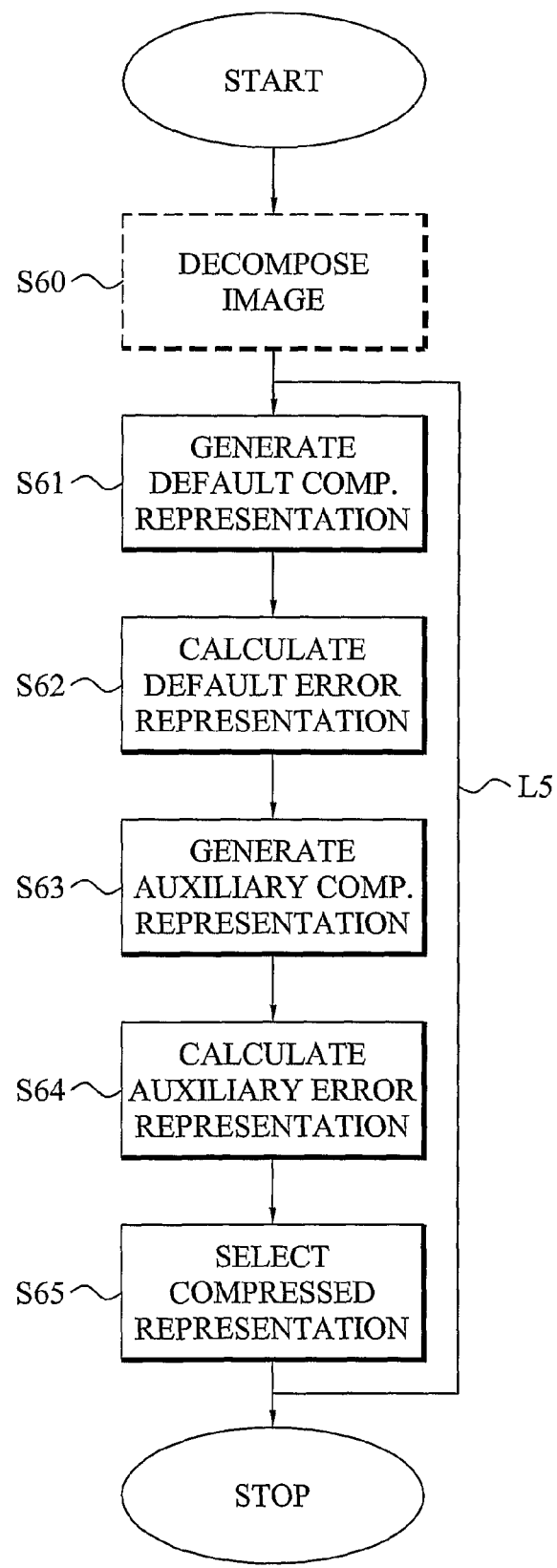
Figure 14:
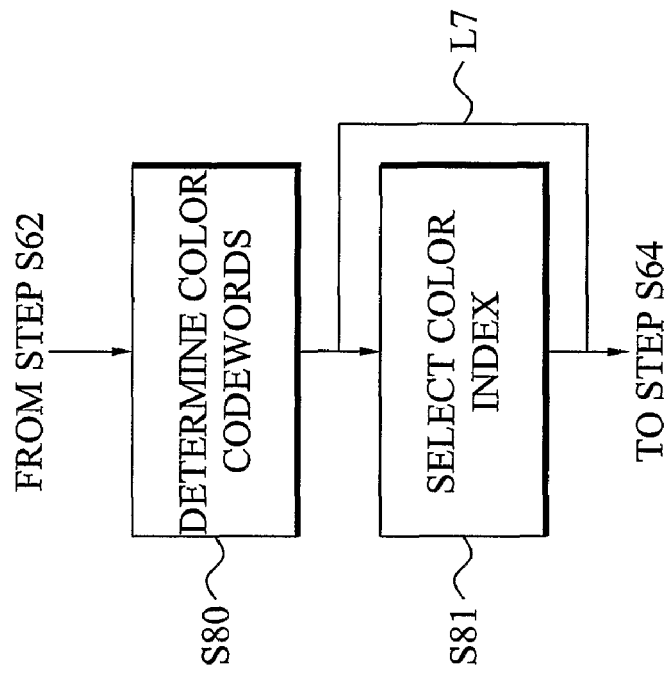
Figure 13:
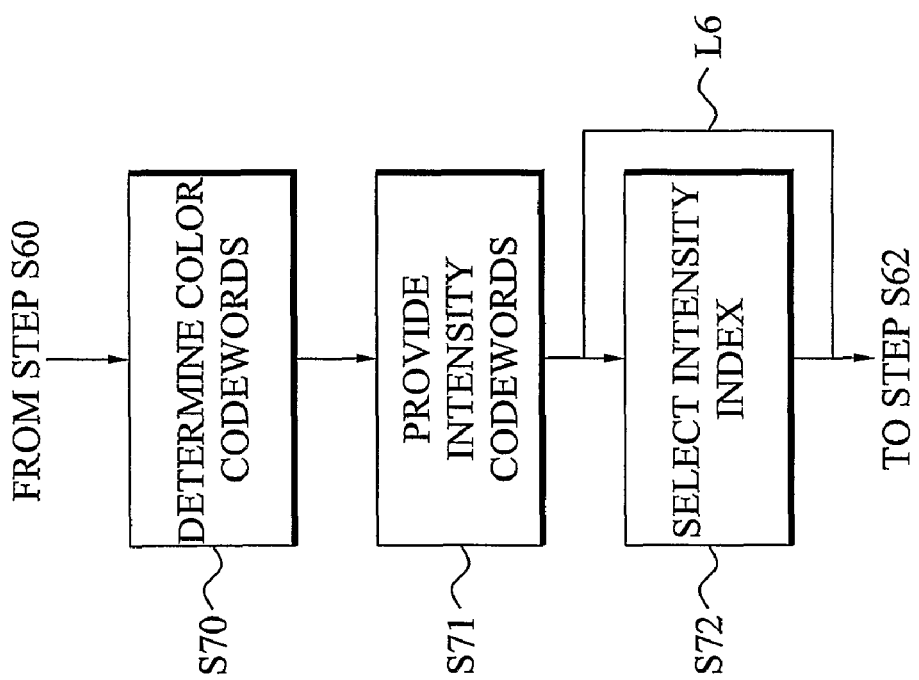
Figure 15:
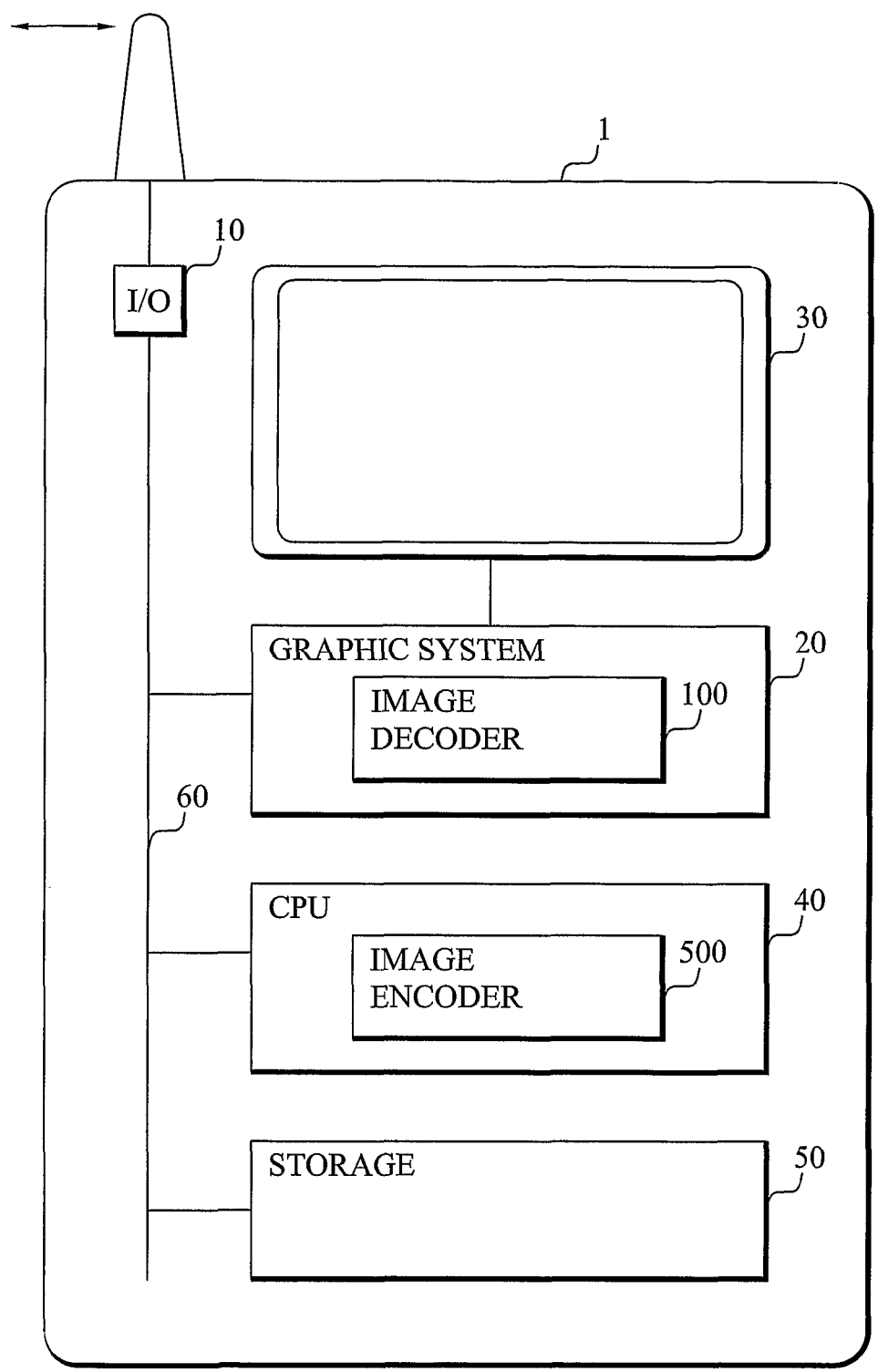
Figure 17:
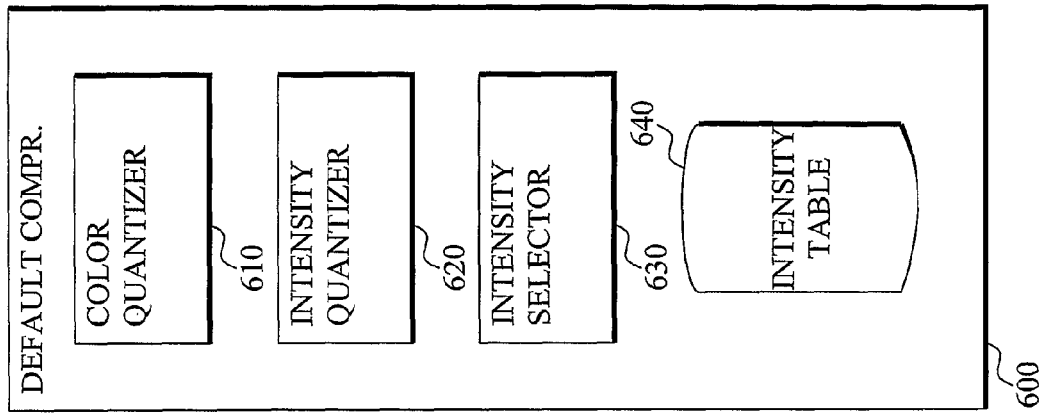
Figure 16:
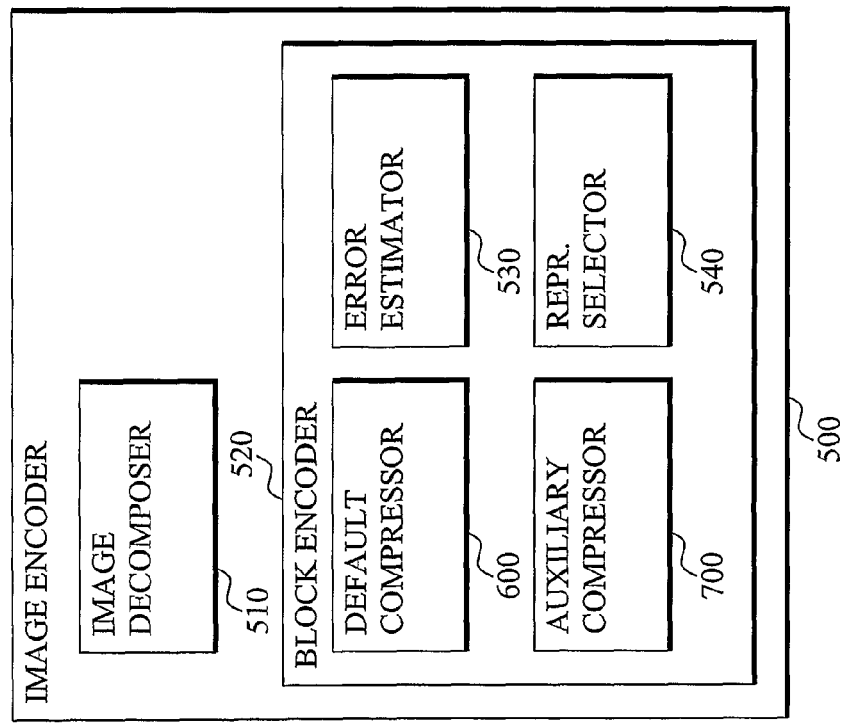
Figure 19:
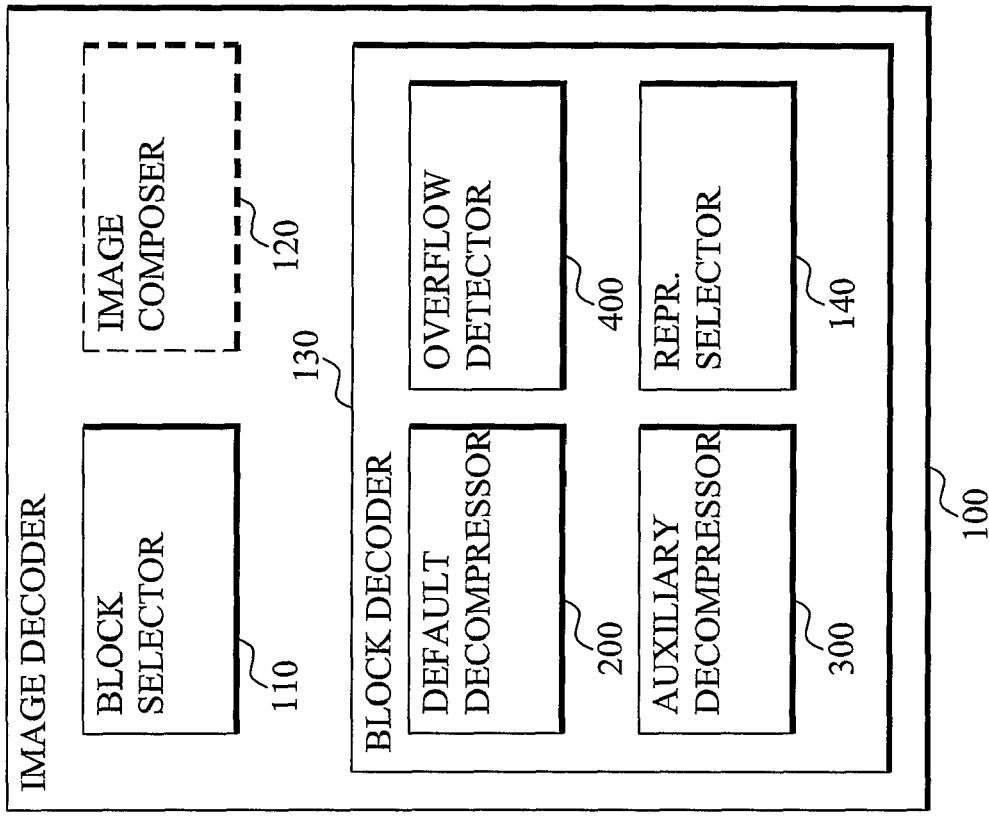
Figure 18:
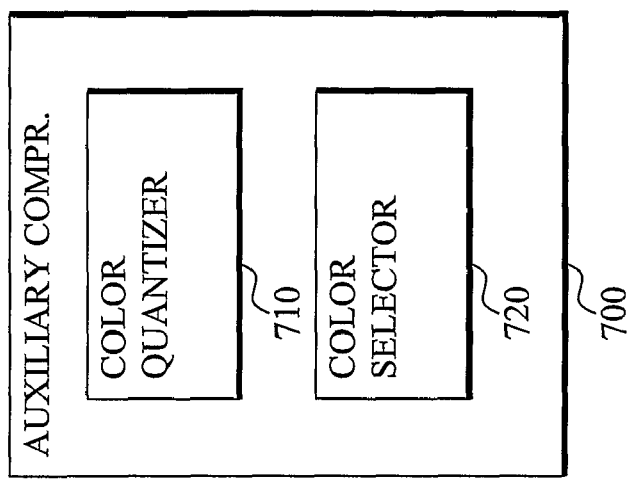
Figure 20:
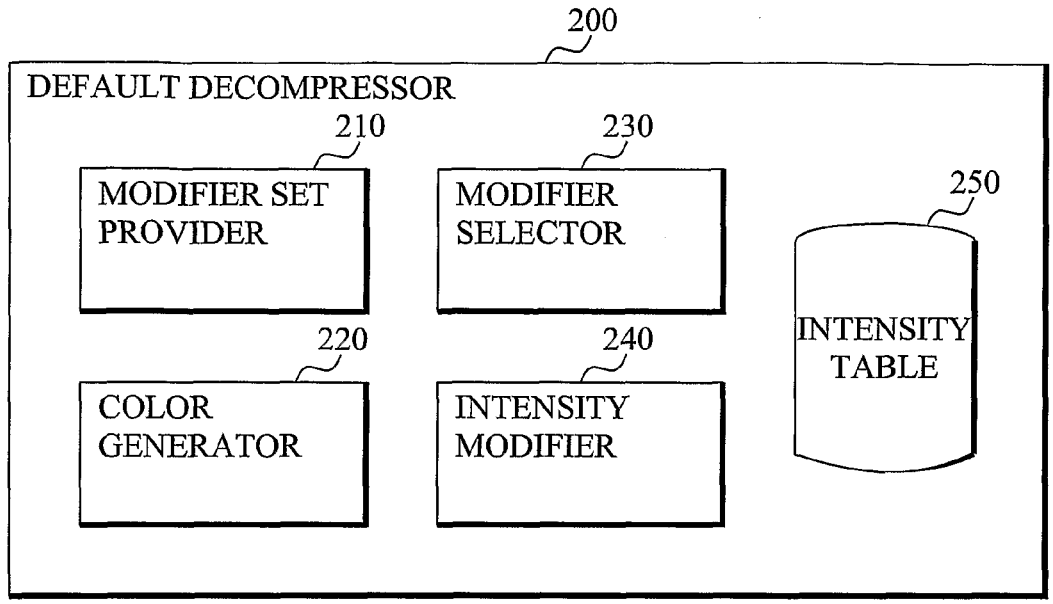
Figure 21:
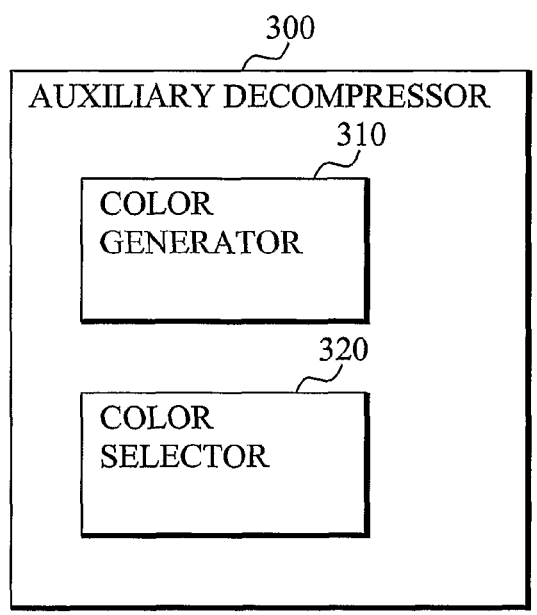
Figure 22:
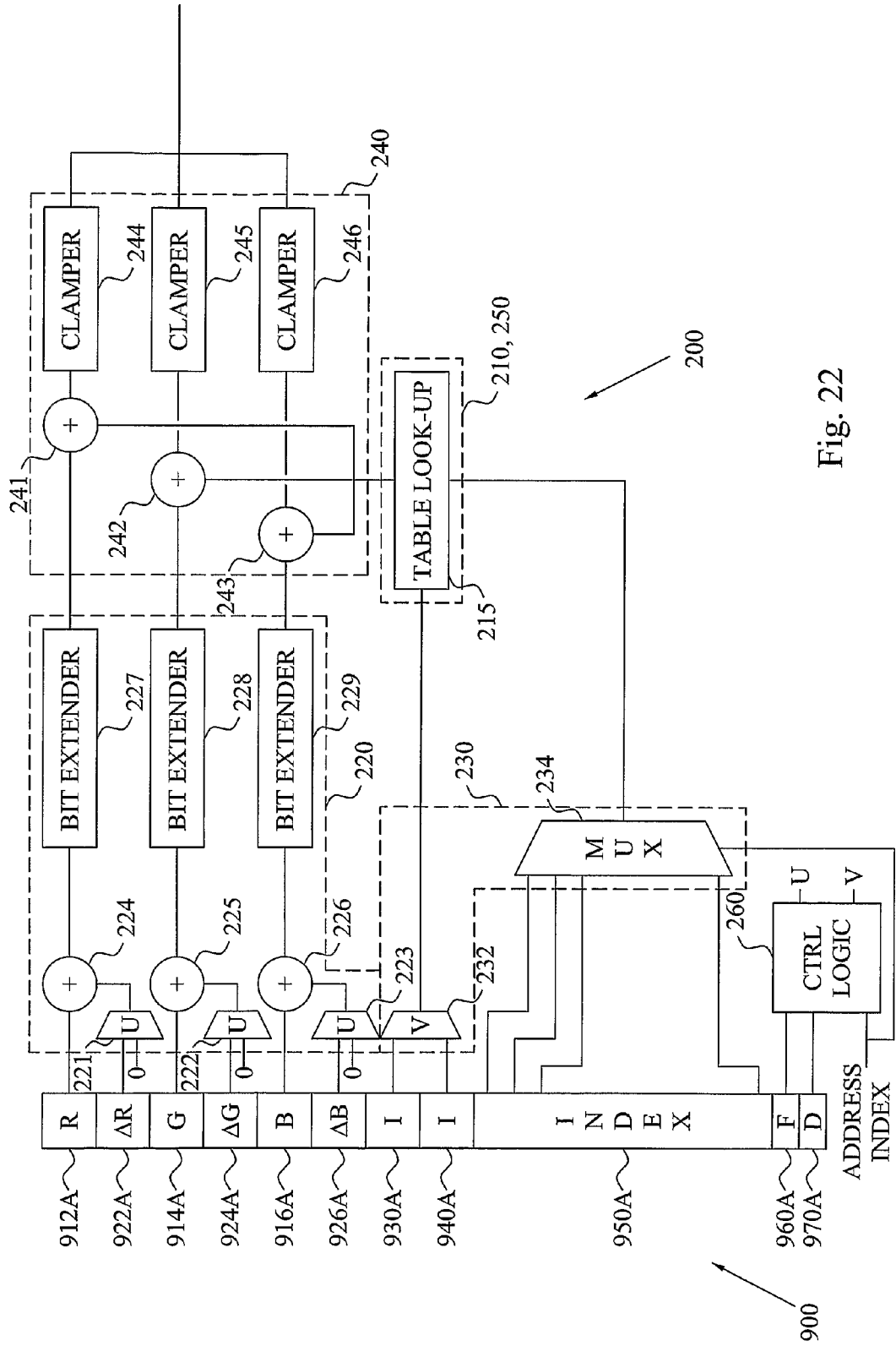
Figure 23:
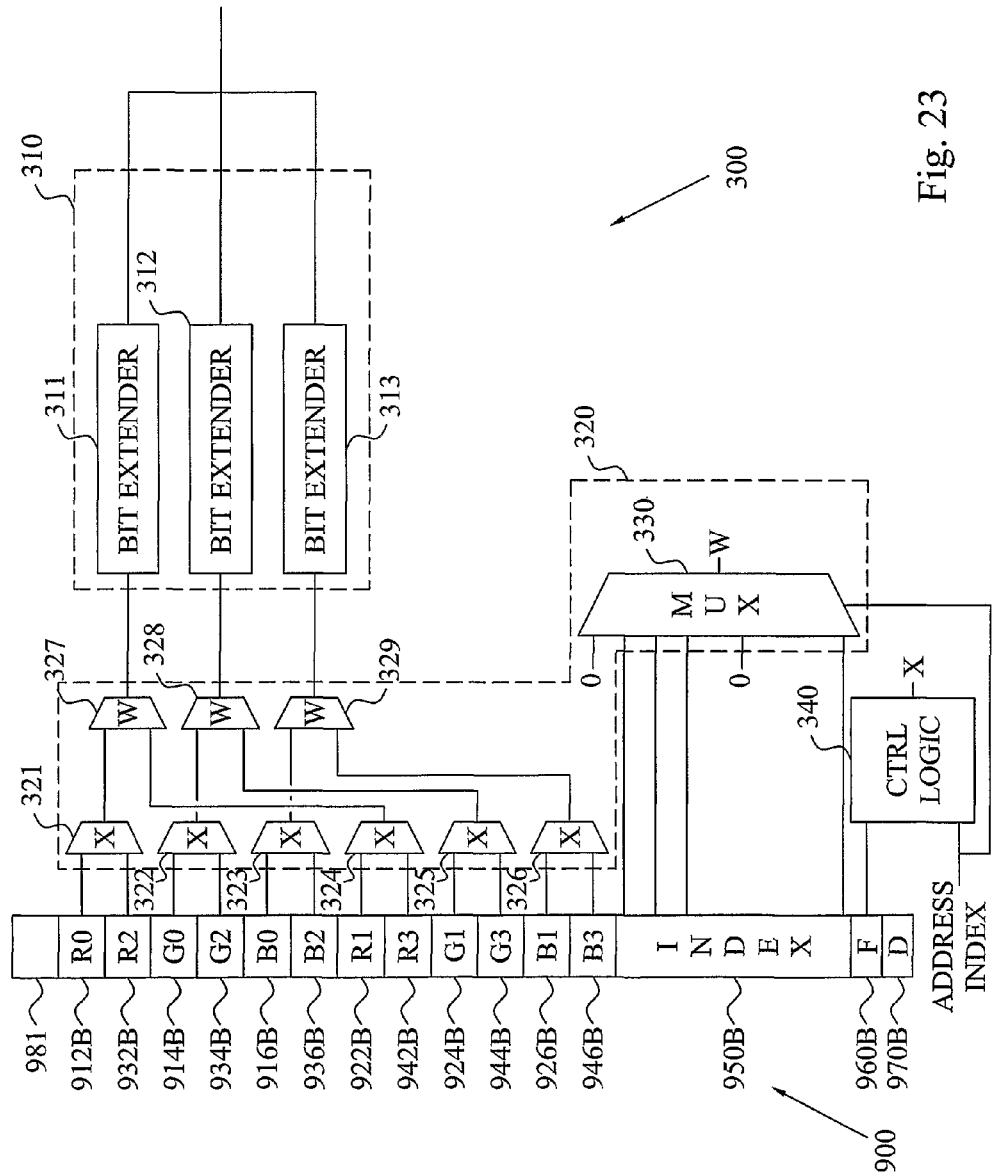

FIG. 3 schematically illustrates different image block embodiments applicable according to the present invention;

FIGS. 4A to 4C schematically illustrate compressed representations of an image block applicable according to the present invention;

FIG. 5 is a flow diagram illustrating an embodiment of the selecting step in FIG. 301 in more detail;

FIG. 6 is a flow diagram illustrating an embodiment of the selecting step in FIG. 3 in more detail;

FIG. 7 is a flow diagram illustrating an embodiment of the step of generating a default decompressed block in FIGS. 1 and 3 in more detail;

FIG. 8 is a flow diagram illustrating an embodiment of the step of generating an auxiliary decompressed block in FIGS. 1 and 3 in more detail;

FIG. 9A is a schematic illustration of an embodiment of a system for processing a compressed image block representation;

FIG. 9B is a schematic illustration of another embodiment of a system for processing a compressed image block representation;

FIG. 9C is a schematic illustration of a further embodiment of a system for processing a compressed image block representation;

FIGS. 10A and 10B are block diagrams over possible implementations of the overflow detectors of FIGS. 9A to 9C;

FIGS. 11A to 11E illustrate different embodiments of how bits can be placed in compressed image block representation in the different operation modes according to the present invention;

FIG. 12 is a flow diagram illustrating an embodiment of compressing an image block according to the present invention;

FIG. 13 is a flow diagram illustrating an embodiment of the step of generating a default compressed representation in FIG. 12 in more detail;

FIG. 14 is a flow diagram illustrating an embodiment of the step of generating an auxiliary compressed representation in FIG. 12 in more detail;

FIG. 15 schematically illustrates an example of a user terminal with an image encoder and decoder according to the present invention;

FIG. 16 is a block diagram schematically illustrating an embodiment of an image encoder according to the present invention;

FIG. 17 is a block diagram schematically illustrating an embodiment of the default compressor of FIG. 16 in more detail;

FIG. 18 is a block diagram schematically illustrating an embodiment of the auxiliary compressor of FIG. 16 in more detail;

FIG. 19 is a block diagram schematically illustrating an embodiment of an image decoder according to the present invention;

FIG. 20 is a block diagram schematically illustrating an embodiment of the default decompressor of FIG. 19 in more detail;

FIG. 21 is a block diagram schematically illustrating an embodiment of the auxiliary decompressor of FIG. 19 in more detail;

FIG. 22 is a hardware block diagram schematically illustrating an embodiment of a default decompressor according to the present invention; and FIG. 23 is a hardware block diagram schematically illustrating an embodiment of an auxiliary decompressor according to the present invention.

DETAILED DESCRIPTION

Throughout the drawings, the same reference characters will be used for corresponding or similar elements.

The present invention relates to image and graphic processing, and in particular to encoding or compressing images and decoding or decompressing encoded (compressed) images and can be regarded as a complement to existing image and texture processing schemes.

Generally, according to an aspect of the invention, during image encoding, an image is typically decomposed or divided into a number of image blocks 800, of which one is illustrated in FIG. 3. Each such image block 800 then comprises multiple image elements 810 having image element associated properties. The image blocks 800 are then encoded to generate an encoded representation of the image. Different image processing schemes are adapted for different image block sizes, some utilizes quadratic blocks 800 having $2^n \times 2^n$ or $2^n \times 2^n \times 2^n$ image elements 810, where n is a positive integer, whereas other utilize other block sizes, e.g. having $2^m \times 2^n$ or $2^m \times 2^n \times 2^p$ image elements where m, n, p independently is zero or a positive integer. Even though most processing schemes employ block heights and widths that are factors of two, other solutions exist such as POOMA [5].

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

In the present invention the expression "image element" refers to an element in an image block or encoded representation of an image block. This image block, in turn, corresponds to a portion of an image or texture. Thus, according to the invention, an image element could be a texel (texture element) of a (1D, 2D or 3D) texture or a pixel of a (1D, 2D or 3D) image. Generally, an image element is characterized by certain image-element properties, such as a color value, transparence or alpha value, a normal, etc. Furthermore, in the following, the term "image" is used to denote any 1D, 2D or 3D image or texture that can be encoded and decoded by means of the present invention, including but not limited to photos, game type textures, text, drawings, etc.

In the present invention, the expression "default processing (compressing or decompressing) mode" represents the normal processing (compressing or decompressing) procedure or algorithm dictated by a particular image processing (compressing or decompressing) scheme, such as BTC [1], QCC [2], S3TC [3], POOMA [5], etc. Thus, these default modes are the known prior art techniques employable for compressing an image or image block and decompressing a compressed image or image block. Thus, a default compressing mode generates a (default) compressed representation of an image block. A default payload portion of this compressed image block then comprises the useful (bit) sequence that actually is used for representing the image block. In many default compressing modes, this default payload portion consists of the whole compressed image block representation. However, in some default modes, a portion of the compressed block could be employed for other purposes, e.g. dictating image block size (in cases with a variable block size), indicate default mode (in cases with a choice between at least two default compressing modes), etc. Even, though, this portion of the compressed block is relevant during the decompression, it actually does not represent any useful information for decoding the image elements of the block.

For each such image processing scheme, the present invention presents and utilizes at least one "auxiliary processing (compressing or decompressing) mode", in addition to the default processing (compressing or decompressing) mode. This auxiliary processing can then be used to manage those image block types that the corresponding default mode handles poorly. For example, assume that the default compressing mode generates two color codewords for the image block. Such a representation of the color values for the image elements in the block is not particularly effective if the chrominance of the image elements in the block is more or less the same but the image elements have different luminances.

The present invention further identifies certain compressed image block representations (bit combinations) that can be used in this auxiliary block processing, whereas the remaining block representations are processed normally according to the default processing mode. In order to be able to detect these particular block representations, a selection portion of the compressed block representation will be used for discriminating between the default and auxiliary modes. The auxiliary processing mode can process an auxiliary payload portion of the compressed block representation for generating a decompressed representation of the image block. Note further that this auxiliary payload portion is smaller than the corresponding default payload portion utilized according to the default mode, due to that the entire discriminating portion or sequence cannot be employed for block encoding purposes in the auxiliary mode. However, even though the default mode can utilize more bits for compressing an image block and decompressing a compressed block, the auxiliary mode can be more efficient and generate higher image quality for certain image blocks.

In an embodiment, the selection portion only has discriminating function and cannot be used for encoding the block in the auxiliary mode. In an alternative embodiment, sub-portion of the selection portion will be employed both for discriminating function and encoding function, whereas the remaining sub-portion of the selection portion only has discriminating function. In this embodiment, a part of the auxiliary compressed block will actually belong to both the selection portion and the auxiliary payload portion. However, in both the embodiments, the auxiliary payload portion is smaller than the corresponding default payload portion.

As was noted in the foregoing, most image processing schemes do not fully exploit the compressed representations of the image blocks and images. As a consequence, for a given image processing scheme, there may bit combinations or sequences (compressed image block representations) that do not represent any meaningful image block and/or there may be unnecessarily redundancy in the compression procedure. This redundancy or the meaningless bit combinations can then be utilized for usage with the auxiliary mode, whereas the remaining bit combinations are processed according to the default mode.

Decompression

FIG. 1 is a flow diagram illustrating an embodiment of processing or decompressing (decoding) a compressed representation of an image block comprising multiple image elements according to the present invention. The method starts in step S1, where the compressed block is investigated to determine whether the block should be decompressed according to the normal default mode or an auxiliary mode, i.e. whether the block is adapted for processing according to the default or auxiliary mode. This determination or selection of step S1 is based on a selection portion of the compressed block. Thus, a sub-sequence of the total bit sequence of the compressed block is used in this mode detection. As will be described in more detail below, this selection portion can, when processing the block according to the default mode, be one or more codewords representing image element associated properties, or a portion of this one or more codewords.

If the default processing mode is selected in step S1, the method continues to step S2, where the compressed image block is processed according to the default processing mode in order to generate a decompressed representation of at least a portion of the image block. Thus, in this step S2 one, some of or all image elements of the block can be decompressed, depending on which portion of the image that should be decoded and rendered.

The default processing mode can potentially utilize a default payload portion of the compressed block in the generation of the decompressed image block. The default payload portion can be equal to the whole bit sequence of the compressed block or a smaller portion thereof (i.e. excluding bit sub-sequences employed for other purposes).

If instead the auxiliary processing mode is selected in step S1 based on the selection portion of the compressed block, the method continues to step S3, where the compressed image block is processed according the auxiliary processing mode in order to generate a decompressed representation of at least a portion of the image block. The auxiliary processing mode can potentially only utilize an auxiliary payload portion of the compressed block in the generation of the decompressed image block. This auxiliary payload portion is further smaller than the default payload portion since a part of the compressed block that can be used in the default processing mode now has to be used for signaling that the auxiliary processing mode should be employed.

Even though the selection or detecting step S1 has been illustrated as a separate process step preceding the decompressing step S2 and S3, this selection of processing mode could alternatively be performed during the actual block decompression. For example, the processing according to the default and auxiliary mode could start with the same or similar process step(s), whereas the difference between the two modes comes first in the next following process step(s). In such a case, the compressed image block could first be processed according to the common or similar process step(s) and then the selection of processing mode to employ for the remaining process step(s) is performed based on the selection portion. As a consequence, at this selection step, the compressed block representation is already partly processed but the continuing block processing is then performed according to the auxiliary mode or the default mode, depending on the actual selection.

This means that the choice of processing mode to use for a compressed block can, according to this embodiment, can be performed processing the compressed block or during the block processing.

Steps S1 to S3 are then preferably repeated for all image blocks that comprise image elements that should be decoded (schematically illustrated by line L1). This means that the loop of steps S1 to S3 could be performed once, but most often several times for different encoded image blocks and/or several times for a specific encoded image block. Note the (vast) majority of the image blocks of the image or texture, will typically be processed according to the default mode in step S2 and the auxiliary mode in step S3 will only be used for the remainder (few) image blocks.

In the optional step S4, a decoded representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

If there is more than one auxiliary processing mode available, the selecting step S1 preferably selects the default mode or one of these auxiliary modes based on a sub-sequence of the compressed image block.

Figure 2:
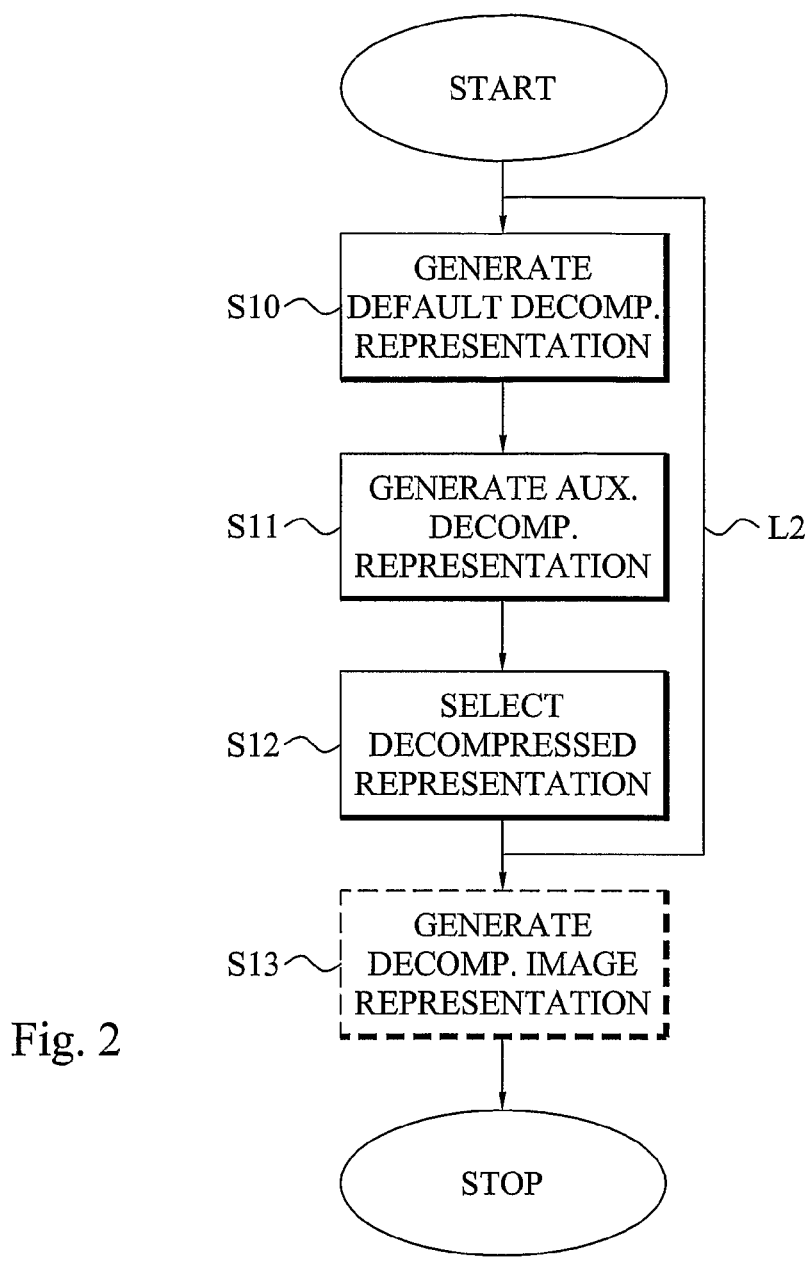
FIG. 2 is a flow diagram illustrating another embodiment of processing a compressed representation of an image block according to the present invention.

FIG. 2 illustrates a flow diagram of another embodiment of the method of processing a compressed representation of an image block comprising multiple image elements according to the present invention. The method starts in step S10, where a default decompressed representation of at least a portion of the compressed image block is generated by processing the default payload portion of the compressed block according to the default processing mode. Thus, this step S10 basically corresponds to step S2 in FIG. 1. In a step S11, a corresponding auxiliary decompressed representation of the at least a portion of the block is generated by processing the auxiliary portion of the compressed block according to the auxiliary processing mode. This step S11 is similar to step S3 in FIG. 1 and as in FIG. 1, the auxiliary payload portion is smaller than the default payload portion. The two steps S10 and S11 can be performed sequentially or in parallel. In a next step S12, a decompressed representation to use for the current block is then selected between the default decompressed block and the auxiliary decompressed block. This selection of step S12 is based on the same selection portion of the compressed block as the selection of step S1 in FIG. 1.

Thus, in the processing embodiment described in connection with FIG. 1, each compressed image block is first investigated and forwarded either to a default block decompressor or an auxiliary block decompressor. In the processing embodiment of FIG. 2, each compressed image block is forwarded both to the default block decompressor and the auxiliary block decompressor and the selection is then performed after the generation of the two different decompressed block representations.

Steps S10 to S12 are then preferably repeated for all image blocks that comprise image elements that should be decoded (schematically illustrated by line L2). This means that the loop of steps S10 to S12 could be performed once, but most often several times for different encoded image blocks and/or several times for a specific encoded image block.

The optional step S13 correspond to step S4 in FIG. 1 and is not further described herein.

If there is more than one auxiliary mode available, an auxiliary decompressed block representation is then generated for each such auxiliary mode and the selection is then performed, based on a sub-sequence of the compressed image block, among all these auxiliary decompressed blocks and the default decompressed block.

The particular default processing mode to employ in step S2 of FIG. 1 and step S10 of FIG. 2 is dictated by the relevant image processing scheme employed. Also the particular auxiliary processing mode(s) to employ in step S3 of FIG. 1 and step S11 of FIG. 2 is (are) dependent on the relevant current image processing scheme and in particular dependent on the shortcomings of this processing scheme. As has been noted in the foregoing and will be described further herein, the present invention is not limited to a particular image processing scheme and, thus, not limited to usage of a particular default and auxiliary mode. Further below examples of default and auxiliary modes will be given for a few processing schemes in order to illustrate the principles of the invention in more detail.

FIG. 4A is a schematic representation of a compressed representation 900 of an image block according to an embodiment of the present invention. The compressed block 900 includes the selection portion 980 that are used for selecting between the processing modes and a remaining data sequence 990. According to the default processing mode, the whole compressed block sequence 900 codes useful bit information that is employed when generating the default decompressed block. Thus, in this mode the bit sequence 980 could represent e.g. one or more codewords or a part of one or more codewords. Thus, in this default mode, the entire selection portion 980 has both discriminating and encoding function. However, an auxiliary processing mode can only maximally utilize a sub-sequence 990 of this compressed block 900 since the remaining selection portion or sub-sequence 980 thereof has to be employed for discriminating between the different available processing modes and is, thus, employed as mode selection sequence in this mode.

Note that the particular position of the selection sequence 980 and the data sequence 990 can differ from what is illustrated in the figure. Furthermore, the selection sequence 980 or parts thereof can be intermixed in the data sequence 990.

Note further that a sub-sequence of the selection sequence 980 could have both discriminating and encoding function in the auxiliary mode. In such a case, the auxiliary payload portion comprises the data sequence 990 and this sub-sequence of the selection sequence 980.

The present invention can advantageously be applied to processing schemes, in which the compressed block representation includes two codewords representing a same type of image element associated property. Examples of such processing schemes include BTC [1], CCC [2], S3TC [3], POOMA [5] and the CCC-mode of the processing scheme denoted Packman-CCC [7], which all use two grey-scale or color codewords (C0 and C1) for each image block, and the image elements of the block are associated with color indices into either of these two colors, or into some other colors derived from these two colors. A decompressed representation of an image block based on compressed representation, in which C0=C1=X, will be identical to a compressed representation, in which C1≠C0=X and all indices point to the color codeword C0.

Thus, storing the same color representation in both color C0 and color C1 does not provide any colors that cannot be encoded in other ways. Then it does not really matter which color index that is used for each image element, because each image element can only be of color C0 (which is the same as C1). Assume that e.g. C0=(10,0,5), and that we want all image elements in the block to have that color. Then you can instead set C1 to some other color than C0, and let each color index point to C0. The so-obtained compressed image block can then be processed (decompressed) as normal, i.e. utilizing the default processing mode.

This means that bit combination where C0=C1 is useless, since we can code every such image block the "default" way instead. This opens up an opportunity to utilize the compressed image block representations for which C0=C1 for performing the auxiliary processing mode. Thus, for these processing schemes, the respective normal default processing mode will be employed if the two color codewords are different, whereas a compressed image block having identical color codewords is processed according to an auxiliary processing mode.

Assume that an image block is encoded into 64 bits (e.g., S3TC [3]), and that C0 and C1 use 16 bits each. The point of our invention is thus, that if C0=C1, we have actually detected a mode which does not get used (because it can be coded in other ways, as shown above). In our example here, that means that we have 64−16−16=32 bits left to encode the colors of the image block in another more efficient way not previously possible with the standard or default processing mode. With reference to FIG. 4A, in such a case, the two color codewords would constitute the selection portion 980 of the compressed image block 900 that is used for selection of processing mode and the remaining 32 bits would then be the data sequence 990 that can be used for representing the image block according to the auxiliary mode (the default mode can typically use all 64 bits).

However, there are (in this example) $2^{16}$ different ways where C0=C1. This means that we can get an additional 16 bits extra for coding the block. Thus, in this example, when C0=C1, we use the auxiliary mode that actually can use up to 48 bits to encode the image elements of the block. This means that we will have two modes, the default processing mode where C0≠C1 ($2^{64}-2^{48}$ bit combinations) and the auxiliary processing mode where C0=C1 ($2^{48}$ bit combinations). In this illustrative example, the selection portion will be the two (16-bit) color codewords and the auxiliary payload portion may contain the remaining 32 bits and one of the codewords.

This means that one of the codewords of the selection portion can be used for encoding purposes. In such a case, the actual bit combination to use for C1 (or C0) is determined by the auxiliary compression and the bit combinations of the other codeword C0 (or C1) is then set to be equal to C1 (or C0).

All the image blocks that are used in today's S3TC textures can be coded in the default mode. This means that the $2^{48}$ bit combinations can be employed in another way, i.e. they come "for free". As a consequence, two coders can be devised, one default block coder that compress the image block according to the default mode, making sure that C0 is not C1 and one auxiliary block coder that will compress the image block in a totally different way (according to an auxiliary compressing mode), and pack the 48 bits in the 64 bit word so that C0=C1.

The encoding process can then be represented by:

```
for all blocks
    err_default = tryEncodingDefaultWay(block);
    err_auxiliary = tryEncodingAuxiliaryWay(block);
    if(err_default < err_auxiliary)
        codedBlock = encodeDefaultWay(block);
    else
        codedBlock = encodeAuxiliaryWay(block);
    end;
    storeCodedBlock(codedBlock);
end;
The decoding process could looks like this:
for all blocks
    codedBlock = getCodedBlock( );
    C0 = getC0fromCodedBlock(codedBlock);
    C1 = getC1fromCodedBlock(codedBlock);
    if(C0 == C1)
        decodedBlock = decodeAuxiliaryWay(codedBlock);
    else
        decodedBlock = decodeDefaultWay(codedBlock);
    end;
    storeDecodedBlock(decodedBlock);
end;
```

Note that we will always gain from employing an auxiliary mode. The reason is that we are using bit combinations that would otherwise not be employed. Another way of looking at it is that the original S3TC codec was inefficient in that it only used ($2^{64}-2^{48}$) of the total possible $2^{64}$ bit combinations. Thus our representation is only efficient to ($2^{64}-2^{48}$)/$2^{64}$=99.9985%. By employing the present invention to S3TC, the efficiency increases to 100%.

As a proof of concept, a very simple auxiliary processing mode was implemented for improving the default mode of S3TC. The 48 bits in the auxiliary mode were used to encode one 24 bit color, one 8 bit luminance modifier and 16 index bits to choose from either the original 24 bit color or the luminance modified value. The image quality increased by 0.17 dB when using this simple auxiliary mode to enhance S3TC. A more refined auxiliary mode would boost the image quality more than the 0.17 dB, but the advantages of the invention can still be seen therefrom.

There is also an additional way to use the bits even better, and this technique is also part of our invention. When all image elements of the image block should have the same color, then we should encode C0 and C1 differently, and each pixel index should point to C0 (for example). However, at that point, the C1 value is not used, except for the fact that it should not be equal to C0. Thus, this opens up the possibility for us to use $2^{16}-1$=65 535 new different combinations to further improve the auxiliary mode, which means that we have 15 free bits for encoding the color information better (in fact, it is almost 16 bits), in our example.

Another situation in which an auxiliary mode can be applied to S3TC [3] (or likewise BTC [1], CCC [2], etc.) is when all the color indices in the index sequence point to a same base color or color codeword. This means that all image elements in the compressed block will have the same color when being decompressed. Such a block could, in the default mode, be represented by having C0=C1 and make sure that not all color indices point to the same color/codeword. Thus, this is basically opposite to the discussion above.

The selection sequence will then be the index sequence. If all the indices are equal, the auxiliary mode is selected otherwise the default mode should be used. In the auxiliary mode, the auxiliary payload portion will include the (2×16=32) bits of the two color codewords. In addition, the bit(s) of one of the indices can be used for encoding purposes as long as the remaining indices are set equal to this index. This means that a sub-portion of the selection portion will have both discriminating and encoding function in the auxiliary mode. When applying this implementation to a multi-bit index solution (such as S3TC), in which each (color) index consists of at least two bits, a somewhat different selection can arise. In such a case, the auxiliary mode could be selected if all color indices are associated with one of the two color codewords in the compressed block representation. If, however, all the indices are associated with one of the two base colors that are generated as linear combinations of these two codewords, the default mode could be selected even though all the color indices are equal.

It is anticipated by the present invention that the two codewords could represent other image element associated properties than colors, including e.g. transparency/alpha values, normals, intensity, etc.

In another example, the selection portion could include e.g. 8 bits of the total e.g. 64 bits of the compressed block. In this example, some of the bit combinations of the 8-bit word signal auxiliary mode, e.g. $0000\ 0000_{bin}$ (0) and $1111\ 1111_{bin}$ (255), whereas the remaining bit combinations indicate default mode, $0000\ 0001_{bin}$-$1111\ 1110_{bin}$ (1-254). The default mode could potentially use all the 64 bits for block encoding. At first sight the auxiliary mode is limited to 64−8=56 bits for block encoding. However, one of the bits of the 8-bit selection portion can actually be employed for block encoding in the auxiliary mode. Thus, we have then a choice to set this bit to $0_{bin}$ or $1_{bin}$, resulting in an auxiliary payload portion of 57 bits in this illustrative example. The remaining 7 bits of the selection portion have to be set equal to this bit. This principle can be extended and applied to other selection portion (and compressed block) sizes and other pre-defined bit combinations that signal default/auxiliary mode.

Another processing scheme, to which the teachings of the present invention can be applied is denoted iPackman that is an extension of the texture processing scheme described in the documents [8-10]. The basic idea of iPackman is to use larger blocks, 4×4 image elements 800 instead of 4×2 820 or 2×4 830 for Packman, see FIG. 3. In areas where the luminance is more or less constant, but where the chrominance shifts slowly over the blocks, chrominance banding can be visible for the Packman scheme. Since a single chrominance per block is used, the banding edges follow block boundaries, which makes this artifact worse. iPackman overcomes this problem by employing two different default processing modes. In the first mode, two adjacent 2×4/4×2 image blocks are grouped together to a 4×4 block and the base colors, typically average colors, for these blocks are encoded individually with respect to each other, i.e. resulting in two color codewords, preferably two RGB444 color codewords. In the other default mode, a differential color coding is employed with a RGB555 color codeword (C) and a difference color codeword (ΔC). The first basic color is then obtained from the color codeword C and the second color codeword is obtained from the sum of the codewords C+ΔC. The reason for this is that tests have proven that the difference in average color for adjacent pairs of 2×4/4×2 image blocks is in the interval [−4, 3] for 88% of the blocks. Thus, an overwhelming majority of the image blocks can be coded differentially with increased quality compared to the other default mode.

FIG. 4B schematically illustrates a possible compressed block representation 900 for iPackman in the case of the default differential mode. The compressed block 900 includes the color codeword 910 including three color components, red 912A, green 914A and blue 916A, preferably each represented by five bits. The differential color codeword 920A likewise includes three components, red 922A, green 924A and blue 926A, preferably each represented by three bits. Note that other colors than a RGB, e.g. a color in the YUV space or YCrCb space, or any other proprietary color space could alternatively be used. The compressed block 900 further includes two intensity codewords 930A, 940A, one for each 2×4/4×2 sub-block. These intensity codewords 930A, 940A are representations of sets of multiple intensity modifiers that are used (during decoding) for modifying or modulating the intensity of the image elements in the image block. The intensity codewords 930A, 940A are preferably intensity pointers allowing identification of the intensity modifier sets. These pointers could then identify or point to the sets in a table or codebook comprising several different intensity modifier sets. A sequence 950A of intensity indices, preferably one intensity index per image element in the block, is also included in the compressed block 900. Each such intensity index is associated with an intensity modifier from the intensity modifier sets. In other words, the intensity index allows identification of which intensity modifier from the sets to use for a specific image element of the block. A diffbit 970A is employed for selecting between the two default (non-differential or differential) modes and a flipbit 960A defines whether the two sub-blocks of the image block is two 2×4 block or two 4×2 blocks, i.e. placed vertically flipbit=$0_{bin}$ or horizontally flipbit=$1_{bin}$. Note that the mutual order of the codewords 910A, 920A, 930A, 940A, index sequence 950A, flipbit 960A and diffbit 970A of the encoded image block 900 may differ from what is illustrated in the figure.

The corresponding compressed representation for the other default mode of iPackman is identical to FIG. 4B except that the color codeword 910A and differential codeword 920A are exchanged by two color codewords (preferably of equal size).

In the differential default mode, if the color codeword 910A is RGB555, this means that each color component 912A, 914A, 926A is encoded by five bits and can be any value in the interval 0-31 ($00000_{bin}$-$11111_{bin}$). Correspondingly, each color component 922A, 924A, 926A of the differential color codeword 920A can include three bits, i.e. represent a value in the interval −4 to 3 [$000_{bin}$ to $111_{bin}$]. The two basic colors C0 and C1 are then generated according to:

red component of C0=R green component of C0=G blue component of C0=B red component of C1=R+ΔR green component of C1=G+ΔG blue component of C1=B+ΔB Since the color components of C1 represent intensity information, they are allowed to assume the values from 0 (=0.0, no intensity) to 31 (=1.0, full intensity). This means that the bit combinations of the color codeword 910A and the differential codeword 920A that result in that additions R+ΔR, G+ΔG and B+ΔB overflow, i.e. being <0 or >31, will never be used by the encoder operating in the default encoding mode.

This means that there is an opportunity to employ one or more auxiliary processing modes for the bit combinations in which the sum R+ΔR, G+ΔG and/or B+ΔB overflows, i.e. is outside of or exceeds the allowed interval of 0-31.

As is schematically illustrated in FIG. 4B, the default processing mode can use the default payload portion (980A, 990A) that includes the codewords 910A, 920A, 930A, 940A, index sequences 950A and flipbit 960A for representing an image block (the diffbit 970A actually does not provide any useful information for encoding image element associated properties). The selection sequence 980A, 980B, 980C used for discriminating between the default and auxiliary mode can then include one or more color components of the color codeword 910A and the differential codeword 920A, leaving a remaining data sequence 990A, 990B, 990C that can be used for image block encoding in the auxiliary mode.

In the following the present invention will be further described applied to the iPackman scheme. However, this should mere be seen as an illustrative example and the invention can applied to any image processing scheme that have meaningless block representations or redundancy in the block representations.

FIG. 5 is a flow diagram illustrating an embodiment of the selecting step S1 in FIG. 1 in more detail for an iPackman-adapted implementation. The method starts in step S20, where a sum of a (red, green or blue) color component of the color codeword and the differential color codeword is compared to a maximum T2 and minimum T1 value. These threshold values could be, but are not limited to, 31 and 0, respectively. Thus, if the sum is within the interval [T1, T2], the default processing mode is selected in step S20 and the method continues to step S2 in FIG. 1. If, however, the sum exceeds the interval [T1, T2], the auxiliary processing mode is selected in step S20 and the method continues to step S3 in FIG. 1.

The step S20 can be employed for more than one of the (three) color components. In such a case, one can discriminate between different auxiliary processing modes depending on which color component(s) that overflow(s) and/or on how many color components that overflow.

FIG. 6 is a corresponding flow diagram of the selecting step S12 in FIG. 2 adapted for an iPackman implementation. The method continues from step S11 in FIG. 2. In the step S30, a sum of a (red, green or blue) color component of the color codeword and the differential color codeword is compared to a maximum T2 and minimum T1 value. If the sum is within the interval [T1, T2], the default decompressed block representation is selected in step S30 otherwise the auxiliary decompressed block representation is selected. The method then continues to step S13 in FIG. 2.

Also this selecting step S30 can utilize more than one color component as the step S20 of FIG. 5.

FIG. 7 is a flow diagram illustrating an embodiment of the step S2 or S10 of generating a default decompressed representation in FIG. 1 or 2 for iPackman. The step S40 provides an intensity modifier set. This modifier set is provided based on one of the intensity codewords in the encoded representation. Which intensity codeword that is used depends on which image element(s) that should be decoded, i.e. depends on which sub-block the image element(s) belong(s). This set provision is preferably performed by identifying, by means of the intensity codeword, an intensity modifier set from a table comprising multiple modifier sets. However, in some applications it might be possible that the intensity codeword itself comprises the modifier set and that no table look-up is required.

In a next step S41, a color representation is generated for at least one of the image elements of the image block (i.e. for the image element(s) that should be decoded). This color generation is performed based on the color codeword in the encoded block representation or based on the sum of the color codeword and the differential color codeword. The actual choice is once again dependent on to which sub-block the image element(s) belong(s). In step S42, the intensity modifier to use for the image element that should be decoded is selected. The modifier value is selected from the modifier set provided in step S40 based on the intensity index associated with the image element and found in the index sequence of the encoded block representation. Once the correct intensity modifier value is selected in step S42, the intensity of the image element is modified or modulated with this value in step S43. Intensity modification according to the invention refers to modifying, e.g. adding or multiplying, all color components of the color representation by the (possibly weighted) intensity modifier value and optionally clamping between a minimum value, e.g. 0, and a maximum value, e.g. 255.

Steps S40 to S43 could be performed for several image elements in the image block (schematically illustrated by line L3). It is anticipated by the invention that in some applications, only a single image element is decoded from a specific image block, multiple image elements of a specific image block are decoded and/or all the image elements of a specific block are decoded. The method then continues to step S4 or S11 of FIG. 1 or 2.

FIG. 8 is a flow diagram illustrating an embodiment of the step S3 or S11 of generating an auxiliary decompressed representation in FIG. 1 or 2 for iPackman. The auxiliary decoding mode interprets the compressed image block representation 900 according to FIG. 4C. The auxiliary payload portion 990 used in this mode (i.e. excluding the selection sequence 980), includes four color codewords 910B, 920B, 930B, 940B, each having three (red 912B, 922B, 932B, 942B, green 914B, 924B, 934B, 944B and blue 916B, 926B, 936B, 946B) color components. Such a color codeword 910B, 920B, 930B, 940B could e.g. be a RGB343 or RGB443, depending on the number of available bits. The compressed block 900 further includes a sequence 950B of color indices. The color index is then associated with and indicates one of the two possible colors or codewords. For example, a color index of $0_{bin}$ could represent the first codeword 910B for an image element positioned in the first sub-block and the third codeword 930B for an image element in the second sub-block. Correspondingly, an index of $1_{bin}$ represents the second 920B or fourth 94013 color codeword depending on to which sub-block the relevant image element belongs.

In a first embodiment, each image element in the block is associated with a respective color index. However, in a preferred embodiment of the invention, resulting a smaller total size of the compressed block representation 900, a subset of the image elements in the block is associated with a pre-defined color codeword selected from the first 910B, second 920B, third 930B and fourth 940B codeword. As a consequence, no selection or assignment of color index has to be performed for this (these) image element(s). For example, the first (last) image element in the first sub-block could always be associated with the first 910B (or second 920B) color codeword and the first (last) image element in the second sub-block could always be associated with the third 930B (or fourth 940B) color codeword. The index sequence does then not need to contain a color index for these first (last) image elements. As a consequence, the sequence will only contain 14 color indices in the case of an image block with totally 16 image elements. It is anticipated by the present invention that more than one image element per sub-block could be pre-associated with a color codeword. A remaining flipbit 960B can be used to indicate whether the sub-blocks should be arranged vertically 820 or horizontally 830 according to FIG. 3.

The step S50, thus, generates a first color representation using the first color codeword, a second corresponding color representation is generated using the second color codeword, a third corresponding color representation is generated using the third color codeword and a fourth corresponding color representation is generated using the fourth color codeword. In the next step S51, the selection for the image elements is then performed among the first, second, third and fourth color representation using the color index, or one of the first, second, third or fourth color representations is pre-associated with one or some of the image elements in the block. Steps S50 and S51 could be performed for several image elements in the image block (schematically illustrated by line L4).

Alternatively, the selection can be performed among the four color codewords instead of among the generated color representations. Thus, a color codeword is selected from the first, second, third or fourth color codeword using a color index associated with the relevant image element and found in the index sequence. However, if the relevant image element belongs to the subset of image elements that does not have an associated color index but instead has a pre-defined associated color codeword, that pre-defined color codeword is identified. Thereafter, a color representation for the image element is generated using the selected or pre-defined color codeword.

In another possible auxiliary processing mode for iPackman, the compressed image block representation four color codewords C0, C1, C2, C3, preferably four RGB color codewords. In this auxiliary embodiment, no color indices are required since the image elements are associated with pre-defined linear combinations of these four colors according to Table 1 or Table 2 below, or by employing some other pre-defined interpolation structure. In these tables only the red components (r0, r1, r2 and r3) of the color codewords are indicated. The green and the blue components are interpolated in the same way.

In an alternative linear combination solution, presented in Table 3, three different colors C0, C1, C2 are used per image block. Three plains are generated, one for each color component. Thus, a plane is fit to the red (green and blue) color component of the image elements in the block. Since three points are enough to represent a plane in 3D, r0, r1 and r2 in Table 3 are examples of sufficient representations for such a plane. Table 3 should merely be seen as an illustrative example of this principle and other solutions are within the scope of the invention.

TABLE 3

| | | | |
|---|---|---|---|
| r0, 0, 0 | r0 + ⅓ (r1 − r0), 1, 0 | r0 + ⅔ (r1 − r0), 2, 0 | r1, 3, 0 |
| r0 + ⅓ (r2 − r0), 0, 1 | r0 + ⅓ (r1 − r0) + ⅓ (r2 − r0), 1, 1 | r0 + ⅔ (r1 − r0) + ⅓ (r2 − r0), 2, 1 | r1 + ⅓ (r2 − r0), 3, 1 |
| r0 + ⅔ (r2 − r0), 0, 2 | r0 + ⅓ (r1 − r0) + ⅔ (r2 − r0), 1, 2 | r0 + ⅔ (r1 − r0) + ⅔ (r2 − r0), 2, 2 | r1 + ⅔ (r2 − r0), 3, 2 |
| r2, 0, 3 | r2 + ⅓ (r1 − r0), 1, 3 | r2 + ⅔ (r1 − r0), 2, 3 | r2 + r1 − r0, 3, 3 |

The number of useful bits (payload portion) that are available for encoding these colors stipulates the respective number of bits that can be employed for the different color codewords and color components. If it the there is enough available bits, all three color components are preferably encoded with the same number of bits, i.e. RGBXXX. However, if this is not possible, preferably an encoding according to RGBXXY or RGBYXZ is employed, where $X \geq Y \geq Z$, e.g. RGB554 for C0 to C3, or RGB555 for C0 to C1 and RGB554 for C3.

Another possible auxiliary mode is to use a black and white encoding (or rather grayscale encoding). The compressed image block could then include two gray-level codewords and two intensity codewords. A sequence of intensity indices, where each such intensity index is associated with an intensity modifier from a set represented by one of the two intensity codewords, is also included in the compressed block. This mode should give better quality for gray-level images.

Thus, there is a large choice of auxiliary modes to employ, and this choice typically depends on what type of image blocks that one would like to specially deal with in the auxiliary mode and how many useful bits there are available to use in this auxiliary mode. In the following, the invention is

TABLE 1

| | | | |
|---|---|---|---|
| r0 | ¾ r0 + ¼ r1 | ½ r0 + ½ r1 | ¼ r0 + ¾ r1 |
| ¼ r0 + ¾ r2 | ¾ (¾ r0 + ¼ r1) + ¼ (¾ r2 + ¼ r3) | ¾ (½ r0 + ½ r1) + ¼ (½ r2 + ½ r3) | ¾ (¼ r0 + ¾ r1) + ¼ (¼ r2 + ¾ r3) |
| ½ r0 + ½ r2 | ½ (¾ r0 + ¼ r1) + ½ (¾ r2 + ¼ r3) | ½ (½ r0 + ½ r1) + ½ (½ r2 + ½ r3) | ½ (¼ r0 + ¾ r1) + ½ (¼ r2 + ¾ r3) |
| ¼ r0 + ¾ r2 | ¼ (¾ r0 + ¼ r1) + ¾ (¾ r2 + ¼ r3) | ¼ (½ r0 + ½ r1) + ¾ (½ r2 + ½ r3) | ¼ (¼ r0 + ¾ r1) + ¾ (¼ r2 + ¾ r3) |

TABLE 2

| | | | |
|---|---|---|---|
| r0 | ⅔ r0 + ⅓ r1 | ⅓ r0 + ⅔ r1 | r1 |
| ⅔ r0 + ⅓ r2 | ½(⅔ r0 + ⅓ r1) + ½(⅔ r0 + ⅓ r2) | ½(⅓ r0 + ⅔ r1)+ ½(⅔ r1 + ⅓ r3) | ⅔ r1 + ⅓ r3 |
| ⅓ r0 + ⅔ r2 | ½(⅓ r0 + ⅔ r2) + ½(⅔ r2 + ⅓ r3) | ½(⅓ r1 + ⅔ r3) + ½(⅓ r2 + ⅔ r3) | ⅓ r1 + ⅔ r3 |
| r2 | ⅔ r2 + ⅓ r3 | ⅓ r2 + ⅔ r3 | r3 | discussed further with reference to iPackman and with the goal of trying to increase the number of useful bits to employ in the auxiliary mode.

With reference to FIG. 4B, assume that color components 912A, 914A, 916A of the color codeword 910A each are encoded with five bits and the color components 922A, 924A, 926A of the differential color codeword 920A each are encoded with three bits. In addition, the two intensity codeword 930A, 940A contain three bits each and the index sequence 950A occupies 32 bits. Finally, the flipbit 960A and diffbit 970A is one bit each. The total size of the compressed block 900 is then 64 bits. However, since the diffbit 970A is actually not a so-called "useful bit" as defined by the invention, the total block size is then 63 bits. However, in a different interpretation this diffbit 970A could be included in the selection portion 980A or the payload portion.

With this in mind, refer to FIG. 9A, that schematically illustrate a block decoder or system 130 for processing a compressed representation 900 according to an embodiment of the invention. This block decoder 130 includes a default decompressor 200 that utilize the default payload portion (63 bits) of the compressed block 900 in order to generate a default decompressed representation of at least a portion of the image block. Correspondingly, an auxiliary decompressor 300 utilizes an auxiliary payload portion 990 of the compressed block 900 in order to generate an auxiliary decompressed block representation. In this embodiment, the selection sequence consists of the red components 912A, 922A of the color codeword and the differential codeword. This means that the size of the auxiliary payload portion will, in this embodiment, be maximally 63−5−3=55 bits. An overflow detector 400 of the block decoder 130 utilizes the bit sequence represented by these red components 912A, 922A in order to detect a possible overflow situation (R+ΔR<0 or R+ΔR>31).

Table 4 below lists the possible overflow situations that the detector 400 responds to.

TABLE 4

| Number | R  | ΔR | Sum |
|--------|----|----|----|
| 0      | 3  | −4 | −1 |
| 1      | 2  | −4 | −2 |
| 2      | 2  | −3 | −1 |
| 3      | 1  | −4 | −3 |
| 4      | 1  | −3 | −2 |
| 5      | 1  | −2 | −1 |
| 6      | 0  | −4 | −4 |
| 7      | 0  | −3 | −3 |
| 8      | 0  | −2 | −2 |
| 9      | 0  | −1 | −1 |
| 10     | 31 | 3  | 34 |
| 11     | 31 | 2  | 33 |
| 12     | 31 | 1  | 32 |
| 13     | 30 | 3  | 33 |
| 14     | 30 | 2  | 32 |
| 15     | 29 | 3  | 32 |

Thus there are 16 possible overflows that can happen. Together, R and ΔR represent 8 bits of data. Thus $2^8$ bit combinations are really possible. Out of this, only $2^8-16$ are used to represent color components and the remaining 16 are used to signal the auxiliary processing mode. The decoding process could look something like:

```
for all blocks
    codedBlock = getCodedBlock( );
    R = getRfromCodedBlock(codedBlock);
    ΔR = getΔRfromCodedBlock(codedBlock);
    if(R+ΔR < 0 OR R+ΔR > 31)
        decodedBlock =
            decodeAuxiliaryMode(remaining55bitsof(codedBlock));
    else
        decodedBlock = decodeDefaultMode(codedBlock);
    end;
    storeDecodedBlock(decodedBlock);
end;
```

Thus, if the detector 400 detects an overflow situation, it commands the selector or multiplexor 140 to selected the decoded block representation generated by the auxiliary decompressor 300, otherwise the default decoded block from the default decompressor 200 should be selected.

However, we can do much better than that, by using the fact that overflow can happen in 16 different ways, and get four bits back from that. A block decoder 130 that operates according to this principle is illustrated in FIG. 9B. This decoder 130 includes a mode detector 150 that was not present in the preceding embodiment of FIG. 9B. This mode detector 150, thus, identifies the particular overflow instance. The operation of this detector 150, when implemented in software, can be according to the following pseudo code:

```
int get4BackBits(R, ΔR)
{
    if(R == 3 AND ΔR == −4)
        return 0;
    elseif(R == 2 AND ΔR == −4)
        return 1;
    elseif(R == 2 AND ΔR == −3)
        return 2;
    elseif(R == 1 AND ΔR == −4)
        return 3;
    elseif(R == 1 AND ΔR == −3)
        return 4;
    elseif(R == 1 AND ΔR == −2)
        return 5;
    elseif(R == 0 AND ΔR == −4)
        return 6;
    elseif(R0 == 0 AND ΔR1 == −3)
        return 7;
    elseif(R == 0 AND ΔR == −2)
        return 8;
    elseif(R == 0 AND ΔR == −1)
        return 9;
    elseif(R == 31 AND ΔR == 3)
        return 10;
    elseif(R == 31 AND ΔR == 2)
        return 11;
    elseif(R == 31 AND ΔR == 1)
        return 12;
    elseif(R == 30 AND ΔR == 3)
        return 13;
    elseif(R == 30 AND ΔR == 2)
        return 14;
    elseif(R == 29 AND ΔR == 3)
        return 15;
}
```

Thus our decoding pseudo code can then be changed to:

```
for all blocks
    codedBlock = getCodedBlock( );
    R = getRfromCodedBlock(codedBlock);
    ΔR = getRfromCodedBlock(codedBlock);
    if(R+ΔR < 0 OR R+ΔR > 31)
```

-continued

```
    decodedBlock =
        decodeAuxiliaryMode(remaining55bitsof(codedBlock),
                            get4BitsBack(R, ΔR));
    else
        decodedBlock = decodeDefaultMode(codedBlock);
    end;
    storeDecodedBlock(decodedBlock);
end;
```

Thus, for this embodiment we have in total 59 bits to use for the auxiliary mode compared to the 55 bits of FIG. 9B. This solution has one drawback if the function get4 bitsBack( ) should be implemented in hardware. In such a hardware implementation, the function should be minimal, in the sense that it should have as low complexity as possible. Having 16 if-statements in hardware can be far too big for some applications. Therefore we will look into how this can be made more efficiently. To do this, we take another look at Table 3, and remake it some to get the Table 5 below.

TABLE 5

| Number | R | ΔR | R bit 7 6 5 4 3 and ΔR bit 2 1 0 | bits 4 3 1 0 | New number |
|--------|---|----|-----------------------------------|--------------|------------|
| 0  | 3  | −4 | 00011 100 | 1100 | 12 |
| 1  | 2  | −4 | 00010 100 | 1000 | 8  |
| 2  | 2  | −3 | 00010 101 | 1001 | 9  |
| 3  | 1  | −4 | 00001 100 | 0100 | 4  |
| 4  | 1  | −3 | 00001 101 | 0101 | 5  |
| 5  | 1  | −2 | 00001 110 | 0110 | 6  |
| 6  | 0  | −4 | 00000 100 | 0000 | 0  |
| 7  | 0  | −3 | 00000 101 | 0001 | 1  |
| 8  | 0  | −2 | 00000 110 | 0010 | 2  |
| 9  | 0  | −1 | 00000 111 | 0011 | 3  |
| 10 | 31 | 3  | 11111 011 | 1111 | 15 |
| 11 | 31 | 2  | 11111 010 | 1110 | 14 |
| 12 | 31 | 1  | 11111 001 | 1101 | 13 |
| 13 | 30 | 3  | 11110 011 | 1011 | 11 |
| 14 | 30 | 2  | 11110 010 | 1010 | 10 |
| 15 | 29 | 3  | 11101 011 | 0111 | 7  |

What has been done here is that the 5-bit color component R and the 3-bit color component ΔR are treated as a combined 8-bit word. If bit 0, 1, 3 and 4 are extracted, a 4-bit word (next last column) is obtained. When converting this 4-bit word into decimals, it covers all numbers from 0 to 15 exactly once. Thus, this can be used as numbering and no complicated function at all is needed in order to obtain the four bits. Instead it can look like this in software:

```
bitVector = get4bitsBack(bit7, bit6, bit5, bit4, bit3, bit2, bit1, bit0)
{
    bits = (bit4, bit3, bit1, bit0);
    return bits;
}
```

In hardware this is a box of wires, 8 wires go in and 4 go out. It is the simplest possible kind of logic (no transistors at all, only wiring). This is how get4 bitsBack( ) could be implemented in hardware. FIG. 9C illustrates the resulting block decoder 130 according to this embodiment. Thus, the mode detector of FIG. 9B has simply been replaced with four connections but still we get to use 59 bits for the auxiliary mode.

FIG. 10A illustrates a possible implementation of the overflow detector 400 for the block decoders of FIGS. 9A to 9C. The detector 400 includes an adder 410 that adds the red component of the color codeword to the red component of the differential codeword. The sum is then provided to two comparators 430, 450. The first comparator investigates whether the sum is smaller than a minimum allowed property threshold $T_1$, e.g. 0, whereas the second comparator investigate whether the sum exceeds a maximum allowed property threshold $T_2$, e.g. 31. If sum<$T_1$ or sum>$T_2$, the respective comparator 450 outputs an overflow signal to the OR-gate 470. This overflow signal is then forwarded to the multiplexor of the block detector that selects the auxiliary decompressed block. If no overflow signal is provided to the OR-gate 470, this represents that the default decompressed block should be selected by the multiplexor.

By investigating the fourth column in Table 4 in more detail, one notices that the selection between default and auxiliary compressing mode actually does not have to be based on all the bits of the red components of the color codeword and the differential codeword. In the eight first entries in this column the bits no. 7, 6, 5 are always $000_{bin}$ and the bit no. 2 is always $1_{bin}$. Correspondingly, for the eight last entries of the column the bits no. 7 6 5 are always $111_{bin}$ and the bit no. 2 is always $0_{bin}$. Thus, a mode selection and overflow detection can be detected only by investigating these four bits and we do not have to compare any sum with the two thresholds.

FIG. 10B illustrates a possible implementation of the overflow detector of FIGS. 9A to 9C that is based on this principle. A first negated exclusive OR (XOR) gate 420 receives the bits no. 7 and 6 of the combined red component word. If these bits are equal the negated XOR-gate outputs $1_{bin}$, otherwise $0_{bin}$. A second negated XOR-gate 440 correspondingly compares the bits no. 6 and 5 (or alternatively 7 and 5) and outputs $1_{bin}$ if they are equal, otherwise $0_{bin}$. A regular XOR-gate 460 is used for comparing the bit no. 2 with one of the bits no. 7, 6, 5, bit no. 5 in the figure. If the two bits are different, the XOR-gate 460 outputs $1_{bin}$. The (negated) XOR-gate outputs are forwarded to an AND-gate 480 that outputs an overflow detection signal if all inputs are $1_{bin}$, otherwise it outputs a default mode selection signal.

It is anticipated by the present invention that FIGS. 10A and 10B should merely be seen as illustrative, but non-limiting, examples of possible implementations of the overflow detector. By exchanging the gates and units of the illustrated overflow detectors to other standard gates, further possible implementations can be obtained. Furthermore, for a computer implementation of the overflow detector, the second last carrier bit and the two sign bits associated with the sum of the color component and the differential color component and the differential color component can be used for detecting an overflow.

Figure 11A:
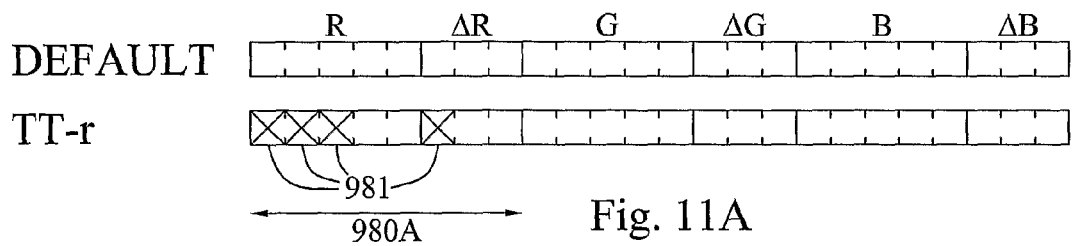

FIG. 11A schematically illustrates a portion of the compressed block representation in the default and the auxiliary (TT-r) mode, respectively. In the default modes all the bits in the color and differential codeword can be used for useful block coding purposes. In the default mode, we now can use all the bits of the two codewords except for four bits 981 of the red components of the codewords that are the minimal part 981 of the selection portion 980 that can be used for discriminating between the two modes.

Figure 11B:
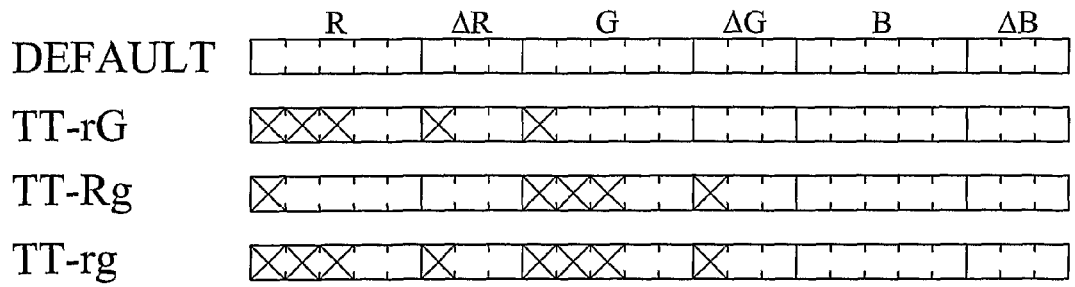

However, in the foregoing we have only investigated if one of the color components (red in the examples above, but the principles can likewise be applied to green or blue) overflows. This procedure can be extended to investigations of two of the color components, e.g. red and green. Let's go through all possible combinations for such a solution. In the following, a color component that is overflowed is marked by a small letter, e.g. r, and a component that is not overflowed is denoted with capital letter, e.g. R. FIG. 11B illustrate the available bits of the color and differential codewords that can be used for coding purposes in the default mode and in the four different auxiliary modes.

We noted above that the two first bits of a color component of the color codeword (bits no. 7 and 6 in the combined word) are always equal if the corresponding color component overflows. Thus, if we are to be sure that the green component will not overflow we have to force bit no. 7 to differ from bit no. 6, i.e. bit7=$\overline{bit6}$, alternatively bit no. 7, 6 or 5 could be forced to be equal to bit no. 2 or bit7=$\overline{bit5}$ or bit5=$\overline{bit6}$. This means that for the auxiliary modes (TT-rG and TT-Rg), in which only one of the color components should overflow, we can only use seven bits of the 8-bit combined color component word. For these two auxiliary modes, the auxiliary payload portion is 63−4−1=58 bits. Finally, we have the auxiliary mode, in which both color components overflow. In this mode, the corresponding auxiliary payload portion will be 63−4−4=55 bits.

In this two-component implementation, we have three auxiliary modes in addition to the default mode, and where the particular auxiliary mode is identified through which color component(s) that overflow(s). In this implementation, there are $2^{58}+2^{58}+2^{55}$ bit combinations that result in an auxiliary mode. However, since $2^{58}+2^{58}+2^{55}=2^{59}+2^{55}$, there is a choice between one 59-bit auxiliary mode and one 55-bit auxiliary mode or two 58-bit auxiliary modes and one 55-bit auxiliary mode.

Figure 11C:
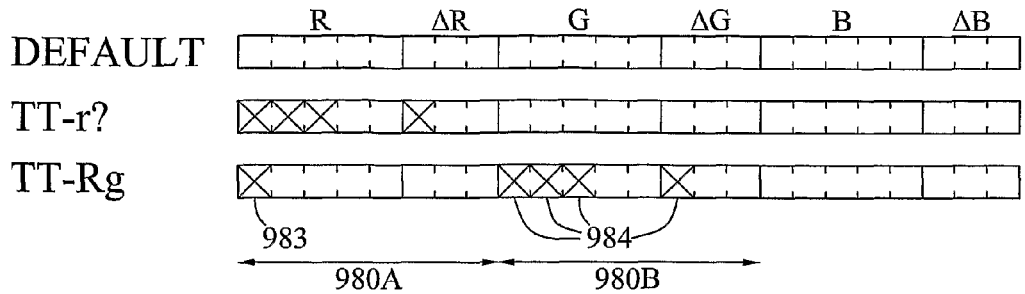

FIG. 11C illustrates another solution for the two-component implementation that also only has two possible auxiliary modes, but with more useful (auxiliary payload) bits. In the first mode (TT-r?), the red component has to overflow. The green component can also overflow but does not have to. Thus, we basically combine the two modes TT-rG and TT-rg from FIG. 11B. This means that one of the bits (e.g. bit no. 7) of the green component is no longer pre-defined based on the actual value of some other bit. On the contrary, also this bit can be used for useful coding. This means that this auxiliary mode can potentially use 63−4=59 bits for encoding purposes. One auxiliary mode (TT-Rg) remains, in which the green component but not the red component overflows. This mode can be detected by investigating the whole green color word 982, but preferably the minimal portion 984 (4 bits) thereof is employed as illustrated in FIG. 11C. In addition, one bit 983 of the red component word is not available for coding purposes but is dictated by one of the other bits in the red component word. The auxiliary payload portion is, in this auxiliary mode, 63−1−4=58 bits.

Figure 11D:
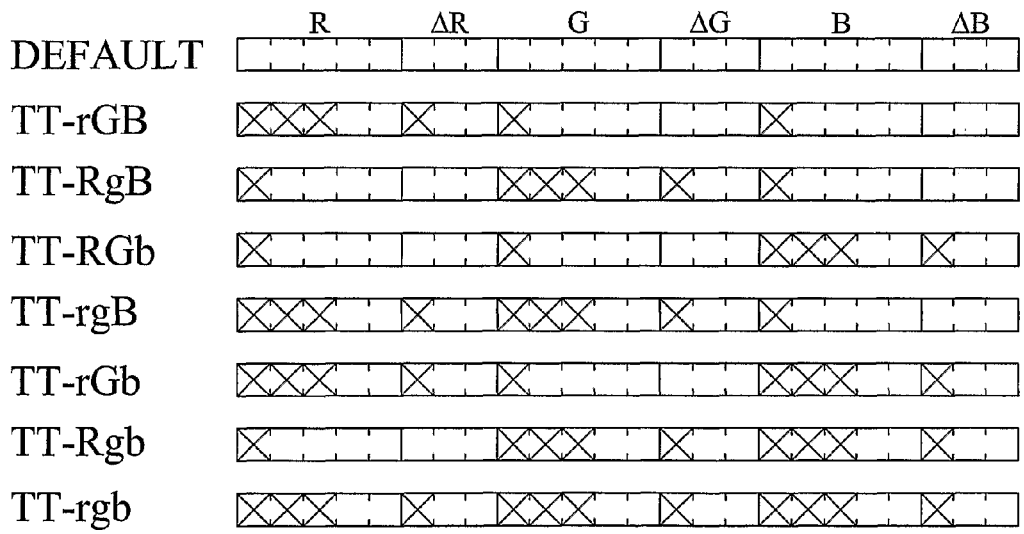

FIG. 11D illustrates the situation where all color components can overflow, which will result in seven different auxiliary modes, depending on which color component(s) overflow(s). Three of these auxiliary modes (the ones in which only one color component overflows, TT-rGB, TT-RgB, TT-RGb) can use a payload portion of 57 bits, three modes (the ones in which precisely two color components overflow, TT-rgB, TTrGb, TT-Rgb) can use 54 bits and the remaining mode, in which all color component overflows (TT-rgb) can use 51 bits.

Figure 11E:
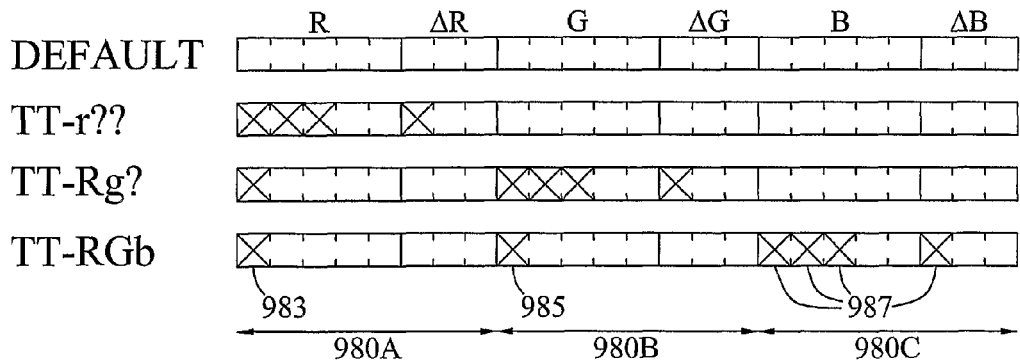

There is, though, another possibility for the three-component situation, as is illustrated in FIG. 11E. In this situation, there are only three auxiliary modes but these can use more bits. In the first mode (TT-r??), only the red component is investigated and this component has to overflow. Four bits are required for singling out this mode, resulting in a payload portion of 63−4=59 bits. In the next mode (TT-Rg?), the green component has to overflow but the red component may not overflow. 4+1=5 bits are required for identifying this mode and the payload portion will include 63−5=58 bits. In the final remaining mode (TT-RGb), only the blue component is allowed to overflow. One bit 983 of the red component word 980, one bit 985 of the green component word 982 and four bits 987 of the blue component word 986 are used for identifying this mode. The remaining payload portion consists of 63−1−1−4=57 bits.

As is evident from the FIGS. 11A to 11E, there is an opportunity to select how many auxiliary modes to employ and how many bits to use for block coding purposes in these modes, simply by selecting one of the embodiments in described above in connection with FIGS. 11A to 11E.

Compression

FIG. 12 illustrates a (lossy) method of encoding an image according to the present invention. In a first optional step S60, the image is decomposed or divided into a number of image blocks. Each such image block then comprises multiple image elements. The actual image block size to use is typically dictated by the particular default processing method employed. As a consequence, the present invention is not limited to any particular image block sizes and can e.g. be applied to an image block having $2^m \times 2^n$ image elements, or $2^m \times 2^n \times 2^p$ image elements, where m, n, p independently are zero or a positive integer. The whole image block is preferably decomposed into (non-overlapping) image blocks in step S60. However, in some applications, only a portion of an image is encoded and, thus, only this portion is decomposed into image blocks.

In a next step S61, an image block is compressed or encoded according to a default compressing mode in order to generate a default compressed representation of the image block. The procedure to employ in this compressing step S61 is determined by the particular image processing scheme used. For example, in iPackman, the default compressing mode determines the color codeword, the color differential codeword, the two intensity codewords, the intensity index sequence and the flipbit. Correspondingly, in BTC [1], CCC [2], S3TC [3], POOMA [5] two gray-scale or color codewords are determined together with a sequence of gray-scale or color indices. The so-obtained default compressed block comprises a default payload portion, which is the (bit) sequence used for encoding and representing the image associated properties of the image block. In most typical applications, this default payload portion contains the whole bit sequence of the compressed block, but could alternatively include a smaller portion thereof (see FIG. 4B, where the diffbit 970 does not form part of the default payload portion 980, 990).

In a next step S62, an error representation is calculated. This error representation is a measure indicative of an image quality representation associated with compressing the image block according to the default compressing mode. In this error calculating step, a decompressed or decoded representation of the image block is typically generated using the image block representation compressed according to the default compression mode in step S61. This means that the compressed block will be decompressed or decoded by employing the default decompression or processing mode of the particular processing scheme. An error value indicative of representing the original image block with this default decompressed block representation is then calculated. Let $R_o^i$ ($G_o^i$, $B_o^i$) denote the value of the red (green, blue) color component of image element i in the original (unprocessed) image block and $R_d^i$ ($G_d^i$, $B_d^i$) denote the corresponding resulting red (green, blue) color component of image element i in the default decompressed block representation. This error value can then be calculated as:

$$\varepsilon^2 = \sum_{i=1}^{N} \left[ (R_d^i - R_0^i)^2 + (G_d^i - G_0^i)^2 + (B_d^i - B_0^i)^2 \right], \quad (1)$$

where N is the total number of image elements in the block. Optionally component-specific weights $w_R$, $w_G$, $w_B$ could be used in equation (1).

A corresponding auxiliary compressed or encoded representation of the image block is determined in step S63, by compressing the image block according to an auxiliary processing mode. The particular auxiliary mode to employ is typically determined by the image processing scheme (BTC, CCC, S3TC, POOM, iPackman, and others). As has been described in the foregoing, it can be possible to utilize multiple different auxiliary modes for a given image processing scheme, where these multiple auxiliary modes possible can use more or less bits for encoding the image block. In such a case, a respective compressed block representation is preferably determined for each such auxiliary compressing mode in step S63. Examples of suitable auxiliary modes for the iPackman scheme have been given above in the description. The auxiliary compressed block also comprises a payload portion employed for encoding or representing the properties, e.g. color, of the image elements in the block. However, since the auxiliary compressed block also comprises a selection sequence or portion employed (by an image block decoder) for detecting that the block has been compressed according to an auxiliary compressed mode and not the default compressed mode, the payload portion of the compressed block is smaller than the default payload portion of the default compressed block. Note though that some of the bits in the auxiliary compressed block may belong to both the auxiliary payload portion and the selection portion.

In a next step S64, at least one error representation is calculated. This error representation is a measure indicative of an image quality representation associated with compressing the image block according to the auxiliary compressing mode. In this error calculating step, a decompressed or decoded representation of the image block is typically generated using the image block representation compressed according to the auxiliary compression mode in step S63. An error value indicative of representing the original image block with the auxiliary decompressed block representation is then calculated. This error calculation step S64 is preferably performed for each auxiliary compressing mode and each auxiliary compressed block, if several.

Step S65 then selects which of the default compressed block and the auxiliary compressed block(s) to use as compressed representation for the current image block. This compressed block selection is performed based on the error representations calculated in steps S62 and S64. Thus, in this selection step S65, the compressed image block that is associated with the smallest error representation is selected as compressed block representation. This results in that the compressed block (out of the different compressed blocks generated) that best represents the original image block will be selected in step S65. Note that for a majority of the image blocks: of the image, the default compressed block will typically be selected in step S65. However, for certain block types, the (one of the) auxiliary compressed block(s) is (are) selected in this step S65.

This procedure S61 to S65 is preferably repeated for all image blocks generated in the decomposing step S60, which is schematically illustrated by the line L5. However, if only a portion of the original image is to be decoded, only one or some of the image blocks will be decompressed.

In an alternative implementation, each image block is first compressed according to the default compressing mode (step S61) and the error metric associated with representing the block according to this default mode is estimated (step S62). In a next step, this error metric is compared to a quality threshold. If the error metric is smaller than the threshold, the default compressed block will be employed as compressed representation for the image block. However, if the error metric exceeds the threshold, the auxiliary compressing mode is also tested. Thus, the image block is then compressed according to the auxiliary compressing mode (step S63). The so-obtained auxiliary compressed block could then be directly employed as compressed representation for the image block. In a preferred embodiment of this implementation, an error metric associated with representing the block according to this auxiliary mode is estimated (step S64). The error metric is thereafter compared to the quality threshold and/or the default error metric. If the auxiliary error metric is smaller than the threshold (and, thus, smaller than the default error metric) or exceeds the threshold but is smaller than the default error metric, the auxiliary compressed block is selected and used as compressed representation for the image block, otherwise the default compressed block will be employed (step S65).

This procedure can be extended to the case with more than one auxiliary mode. It could be possible to use the same quality threshold for the default and the auxiliary modes or different thresholds.

Since a majority of the blocks are typically compressed according to the default mode, this implementation results in that only a single compressed representation and a single error metric has to be generated for the majority of blocks. Only when the default mode fails (produces poor quality) will the auxiliary mode be tested and a further compressed representation and error metric have to be generated.

As has been discussed thoroughly in the foregoing, the default mode typically handles some image blocks somewhat more poorly than the majority of image blocks. For example, it could be possible that the image elements in most blocks are of similar chrominance but have different luminance. These blocks could then be compressed by the default mode with high quality. Some blocks may, however, have dissimilar chrominance and are then typically more suitable for compressing with an auxiliary mode.

In an alternative implementation of the compression of an image block according to the invention, the properties of the image elements in the block are first investigated and a compression mode to employ for the block is selected based on this investigation. In other words, the image block could be regarded as classified as a block suitable for the default mode or the auxiliary mode (or one of the auxiliary modes in the case or multiple such modes). This investigation could e.g. be, at least partly, based on the distribution of the colors (or some other property) of the image elements in the color space (or some other property space). In a next step, the compressed representation of the image block is generated by compressing the block according to the selected compressing mode. This step basically corresponds to step S61 or S62 in FIG. 12, depending on which mode that is actually selected.

The selection portion is further set to represent or indicate the selected compressing mode. This selection portion setting is typically performed during the compressing procedure, in particular for the default mode in which the entire selection portion can be used for block encoding. However, in the auxiliary mode, at most a sub-portion of the selection portion can be "freely" set and used for block encoding. The remainder of the selection portion then has to be set based on the vale of the "free" sub-portion.

This implementation only requires a single compression representation to be generated per image block and does not require any error metric estimations. This simplification comes at the cost of a possible "misclassification" of some of the image blocks and selection of non-optimal compressing mode. However, for most image blocks, a correct compression mode can be selected beforehand simply by investigating the properties of the image elements in the block.

The default compressing and auxiliary compressing steps of FIG. 12 will now be exemplified in more detail with reference to the packman texture processing scheme. FIG. 13 is a flow diagram illustrating the default block compressing step S61 of FIG. 12 in more detail for iPackman. The method continues from step S60 of FIG. 12. In a next step S70, the color and differential color codewords are determined for the image block.

In this step S70, the average (24-bit) colors of the two (2×4 or 4×2) sub-block of the (4×4) image block are determined and quantized into 5 bits for each color component. If the difference between the two quantized average colors is within the interval [−4, 3], one of the RGB555 codewords is used as color codeword and the best possible RGB333 combination will be employed as differential codeword. This means that the differential codeword is preferably selected so that the sum of this differential codeword and the quantized average color of the second block is as close to the quantized color of the first block (=color codeword) as possible.

In a next step S71, the intensity codewords to use for the two sub-blocks are provided. This can performed in an exhaustive search by trying all intensity modifier set and modifier values for each sub-block until the best (in terms of contributing to the smallest error value) modifier set and modifier values of that set are found. The intensity codeword associated with the modifier set is then used as intensity codeword. In addition, the intensity indices associated with the selected modifier values of the set are entered in the index sequence in step S72. An intensity index is selected for each image element in the block, which is schematically illustrated by the line L6.

In a preferred embodiment, the same procedure S70 to S72 is carried out with the block flipped. In other words, if the sub-block each had a size of 2×4 image elements, the now flipped sub-block will have a size of 4×2 image elements, and vice versa. The sub-block orientation (flipped/not flipped) that results in the smallest error metric mode is chosen. The method then continues to step S62 of FIG. 12.

However, due to the fact that the luminance is later modified, it is not certain that the 555 color closest to the base color is the best quantization. Therefore, in an alternative compression approach, all color pairs within ±1 quantization steps are searched. For each color pair, all possible modifier sets and modifier values are tried out.

FIG. 14 is a flow diagram illustrating a possible auxiliary compressing mode that can be used for the iPackman scheme. The method continues from step S62 of FIG. 12. In a next step S80, two color codeword are determined for each sub-block, giving a total of four color codewords for the image block. In a preferred implementation, the first and second color codeword, and third and fourth color codewords are representations of a first and a second portion of the image elements in the sub-block, respectively. This auxiliary compression mode is in particular effective for compressing image sub-blocks, the image elements of which are distributed into two clusters in the color space having different chrominances. One of the color codewords can then efficiently represent the color of the first image element cluster, whereas the other codeword represent the second cluster.

Color indices pointing to or associated with one of the two color codewords available for each sub-block are selected in next step S81. In a first embodiment, each image element in the block is associated with a respective color index. However, in a preferred embodiment of the invention, resulting a smaller total size of the compressed block representation, a subset of the image elements in each sub-block is associated with a pre-defined color codeword selected from the first, second, third or fourth codeword. As a consequence, no selection or assignment of color index has to be performed for this (these) image element(s). For example, the first (last) image element in the first sub-block could always be associated with the first (or second) color codeword. Correspondingly, the first (last) image element in the second sub-block could always be associated with the third (or fourth) color codeword. The index sequence does then not need to contain a color index for these first (last) image elements. As a consequence, the sequence will only contain 14 color indices in the case of an image block with totally 16 image elements. It is anticipated by the present invention that more than one image element could be pre-associated with a color codeword.

The index selection of step S81 is, thus, performed for each image element in the image block that does not have a pre-defined association with one of the color codewords, which is schematically illustrated by the line L7. The method then continues to step S64 of FIG. 12.

Implementation Discussion

The image encoding (image block encoding) and image decoding (image block decoding) scheme according to the present invention could be provided in a general data processing system, e.g. in a user terminal or other unit configured for processing and/or rendering images. Such a terminal could be a computer, or a thin client, such as Personal Digital Assistance (PDA), mobile units and telephones.

Image Processing Terminal

FIG. 15 illustrates an image processing terminal 1 represented by a mobile unit. However, the invention is not limited to mobile units by could be implemented in other terminals and data processing units. Only means and elements in the mobile unit 1 directly involved in the present invention are illustrated in the figure.

The mobile unit 1 comprises a (central) processing unit (CPU) 40 for processing data, including image data, within the mobile unit 1. A graphic system 20 is provided in the mobile unit 1 for managing image and graphic data. In particular, the graphic system 20 is adapted for rendering or displaying images on a connected screen 30 or other display unit. The mobile unit 1 also comprises a storage or memory 50 for storing data therein. In this memory 50 image data may be stored, in particular encoded image data (compressed image blocks) according to the present invention.

An image encoder 500 according to the present invention is provided in the mobile unit 1. This encoder 500 is configured for encoding an image or texture into an encoded representation of the image (or texture). As was discussed above, such an encoded representation comprises a sequence or file of multiple compressed image blocks. This image encoder 500 may be provided as software running on the CPU 40, as is illustrated in the figure. Alternatively, or in addition, the encoder 500 could be arranged in the graphic system 20 or elsewhere in the mobile unit 1. This image encoder 500 is adapted for encoding an image and its including image blocks both according to a default compressing mode and at least one auxiliary compressing mode. In addition, even though the resulting size of the compressed image blocks compressed according to the default or auxiliary mode may be of the same size (in terms of number of bits), the payload portion of the compressed block is smaller for the auxiliary mode compared to the default mode.

An encoded representation of an image from the block encoder 500 may be provided to the memory 50 over a (memory) bus 60, for storage therein until a subsequent rendering of the image. Alternatively, or in addition, the encoded image data may be forwarded to an input and output (I/O) unit 10 for (wireless or wired) transmission to other external terminals or units. This I/O unit 10 can also be adapted for receiving image data from an external unit. This image data could be an image that should be encoded by the image encoder 500 or encoded image data that should be decoded. It could also be possible to store the encoded image representation in a dedicated texture memory provided, for example, in the graphic system 20. Furthermore, portions of the encoded image could also, or alternatively, be (temporarily) stored in a texture cache memory, e.g. in the graphic system 20.

An image decoder 100 according to the present invention is provided in the mobile unit 1 for decoding an encoded image in order to generate a decoded image representation. This decoded representation could correspond to the whole original image or a portion thereof. The image decoder 100 provides decoded image data to the graphic system 20, which in turn typically processes the data before it is rendered or presented on the screen 30. The image decoder 100 can be arranged in the graphic system 20, as is illustrated in the figure. Alternatively, or in addition, the decoder 100 can be provided as software running on the CPU 40 or elsewhere in the mobile unit 1. This image decoder 100 includes functionality for processing an image block according to a default processing mode or at least one auxiliary processing mode. The actual processing mode to utilize for decompressing the compressed block is selected based on a selection sequence or portion of the compressed block.

The mobile unit 1 could be equipped with both an image encoder 500 and an image decoder 100, as is illustrated in the figure. However, for some terminals 1 it could be possible to only include an image encoder 500. In such a case, encoded image data could be transmitted to another terminal that performs the decoding and, possibly, rendering of the image. Correspondingly, a terminal 1 could only include an image decoder 100, i.e. no encoder. Such a terminal 1 then receives a signal comprising encoded image data from another terminal and decodes it to generate a decoded image representation. Thus, the encoded image signal could be wirelessly transmitted between terminals using radio transmitter and receiver. Alternatively, other techniques for distributing images and encoded image representations between terminals could be employed, such as IR-techniques using IR ports, Bluetooth and wired transferring of image data between terminals. Also memory cards or chips that can be connected and exchanged between terminals could be used for this image data inter-terminal distribution.

The units 10, 20, 40, 100 and 500 of the mobile unit 1 may be provided as software, hardware or a combination thereof.

Encoder

FIG. 16 illustrates a block diagram of an embodiment of an image encoder 500 according to the present invention. The encoder 500 typically comprises an image decomposer 510 for decomposing or dividing an input image into several image blocks. This decomposer 510 could be adapted for decomposing different input images into image blocks with different sizes. In such a case, the decomposer 510 preferably receives input information, enabling identification of which image block format to use for a given image.

The image encoder 500 further comprises a block encoder 520. This block encoder 520 encodes the image block(s) received from the image decomposer to generate encoded block representation(s). The overall size of the block representation is much smaller than the corresponding size of the uncoded image block. The block encoder 520 is preferably configured for processing (encoding) each image block from the decomposer 510 sequentially.

The block encoder 520 comprises to at least two block compressors 600, 700, where a first compressor 600 compresses an input image block according to the default compressing mode. Correspondingly, at least one auxiliary compressor 700 compresses an input block according to an auxiliary compressing mode. If there are multiple auxiliary modes available, the single auxiliary compressor 700 could be configured for operating according to any of these auxiliary compressing modes. Alternatively, a dedicated auxiliary compressor 700 could be implemented in the block encoder 520 for each such auxiliary compressing mode.

An error estimator 530 is preferably provided in the block encoder 520 for generating an error metric indicative of representing an input (uncompressed) image block according to one of the compressing modes. This means that at least two such error metrics are estimated, one for the default compressing mode and at least one for the auxiliary compressing mode. As has been discussed in the foregoing, the default (auxiliary) compressed block is first decompressed according to the default (auxiliary) decompressing or processing mode and the error metric is based on a comparison of this generated default (auxiliary) decompressed block and the original image block.

A representation selector 540 is implemented in the block encoder 520 for selecting, which of the default and at least one auxiliary compressed block to use as compressed representation for the currently processed image block. This selection is based on the error metrics estimated by the error estimator 530. Thus, the selector 540 selects the compressed block representation that is associated with the smallest error metric and, thus, typically being the best obtained representation of the image block in terms of image quality.

Alternatively, the default compressor 600 first generates the default compressed block and the error estimator 530 calculates the default error metric. The estimator 530, the selector 540 or some other unit in the block encoder 520 compares this default error metric with a quality threshold. If the error metric is smaller than the threshold, the generated default compressed block is employed as compressed representation for the current block. If the error metric exceeds the threshold, the auxiliary compressor 700 determines an auxiliary compressed representation of the block and the estimator 530 calculates the auxiliary error metric associated with this auxiliary representation. The selector 540 can then select the compressed representation (default or auxiliary representation) that is associated with the smallest error metric.

In an alternative implementation, the representation selector 540 or some of the unit in the block encoder 520 investigates the properties of the image elements in the image block in order to determine whether the image block is most suitable or adapted for compression by the default 600 or auxiliary 700 compressor. The image block is then forwarded to the selected compressor, where it is compressed. The relevant compressor further sets the selection portion in order to indicate the actual compression mode employed for the block.

The units 510, 520, 530, 540, 600 and 700 of the image encoder 500 may be provided as software, hardware or a combination thereof. The units 510, 520, 530, 540, 600 and 700 may be implemented together in the image encoder 500. Alternatively, a distributed implementation is also possible with some of the units provided elsewhere in the user terminal.

In FIG. 16, the image encoder 500 includes a single block encoder 520 that has both a default compressor 600 and an auxiliary compressor 700. In an alternative implementation, the image encoder 500 could include multiple block encoders 520. By providing multiple block encoders 520 in the image encoder 500, multiple image blocks from the decomposer 510 may be processed (encoded) in parallel, which reduces the total image encoding time. Alternatively, a first subset of the block encoders 520 could be operated for compressing an image block according to the default compression mode, whereas a remaining subset of the encoders 520 are operated according to the auxiliary compression mode. Each such block encoder 520 could then have its own error estimator 530. Alternatively, the error estimator 530 and the representation selector 540 are implemented in the image encoder 520 and are in connection with the multiple block encoders 520.

FIG. 17 is a block diagram illustrating a possible implementation of the default compressor 600 of FIG. 16 adapted for the iPackman scheme. The default compressor 600 comprises a color quantizer 610 that determines color representations of the colors of the image elements in the image block and quantizes these color representations. The color representations are preferably 24-bit colors of the image elements in the two sub-blocks and are subsequently quantized to a (15-bit) color codeword and a (9-bit) color differential codeword, by the quantizer 610.

An intensity quantizer 620 is provided in the default compresser 600 for identifying two intensity modifier sets to use for a current image block. The quantizer 620 is preferably configured for selecting these modifier sets from an associated intensity table 640. The quantizer 620 then generates two intensity codewords that is associated with the selected modifier sets. The compressor 600 further includes an intensity selector 630 that selects, for the image elements in the image block, an intensity modifier from one of the identified intensity modifier set.

The units 610, 620 and 630 of the default compressor 600 may be provided as software, hardware or a combination thereof. The units 610, 620, 630 and 640 may be implemented together in the default compressor 600. Alternatively, a distributed implementation is also possible with some of the units provided elsewhere in the block encoder.

FIG. 18 is a block diagram illustrating a possible implementation of the auxiliary compressor 700 of FIG. 16 adapted for the iPackman scheme. The auxiliary compressor includes a color quantizer 710 that generates four (11-bit) color codewords, two such codewords for each sub-block of the image block to be encoded. A color selector 720 then selects color indices for the image elements of the block, which color indices are associated with one of the four generated color codewords. In a preferred implementation, at least one image element of each sub-block has a pre-defined associated with one of the color codewords and, thus, does not need any color index.

The units 710 and 720 of the auxiliary compressor 700 may be provided as software, hardware or a combination thereof. The units 710 and 720 may be implemented together in the auxiliary compressor 700. Alternatively, a distributed implementation is also possible with some of the units provided elsewhere in the block encoder.

The auxiliary compressor adapted for iPackman could alternatively, or in addition, be adapted and including functionality for compressing an image block according to one of the other previously described auxiliary compressing modes.

FIG. 19 illustrates a block diagram of an embodiment of an image decoder 100 according to the present invention. The image decoder 100 preferably comprises a block selector 110 that is adapted for selecting, e.g. from a memory, which encoded image block(s) that should be provided to a block decoder 130 for decoding. The block selector 110 preferably receives input information associated with the encoded image data, e.g. from a header or a rendering engine. An address of an encoded image block having the desired image element(s) is then computed based on the input information. This computed address is preferably dependent upon the image-element (pixel or texel) coordinates within an image. Using the address, the block selector 110 identifies the encoded image block from the memory. This identified encoded image block is then fetched from the storage and provided to the block decoder 130.

The (random) access to image elements of an image block advantageously enables selective decoding of only those portions of an image that are needed. Furthermore, the image can be decoded in any order the data is required. For example, in texture mapping only portions of the texture, may be required and these portions will generally be required in a non-sequential order. Thus, the image decoding of the present invention can with advantage by applied to process only a portion or section of an image.

The selected encoded image block is then forwarded to the block decoder 130. In addition to the image block, the decoder 130 preferably receives information specifying which image elements of the block that should be decoded. The information could specify that the whole image block, i.e. all image elements therein, should be decoded. However, the received information could identify only a single or a few of the image elements that should be decoded. The block decoder 130 then generates a decoded representation of the image element(s) in the block. This decoded representation is preferably a P-bit color, where P is the number of bits per image element in the original image, e.g. a 24-bit RGB color. The block decoder 130 comprises a default decompressor 200 that operates on image blocks compressed according to the default compression mode. The output is then a decompressed or processed default representation of (a portion on an image block. Correspondingly, an auxiliary decompressor 300 is implemented for operating on image blocks compressed according to the auxiliary compressing mode and outputting a decompressed auxiliary representation of an image block.

In certain embodiments, the default 200 and auxiliary decompressor 300 could be a single combined decompressor that operates according to at least two decompression modes. When discussing a default or auxiliary decompressor; this also includes a combined decompressor operating in the default or auxiliary mode.

In an embodiment of the block decoder 130, a mode detector 400 is further included in the decoder 130 for identifying, to which decompressor 200, 300 a compressed block should be forwarded. This means that selection of decompressor/decompression mode is performed prior processing the image block in this embodiment. As a consequence, only a single decompressed representation has to be generated per image block.

In an alternative embodiment, a compressed image block is provided to the default decompressor 200, the auxiliary decompressor 300 and the mode detector 400. Each decompressor 200, 300 then generates a decompressed block representation, whereas the mode detector 400 generates a selection command that is forwarded to a representation selector 140 that selects which of the representations to use.

In either implementation, the detector 400 operates by investigating the bit sequence of the input compressed block representation, and more precisely investigates a selection sequence, or a portion thereof, of the compressed block. In an iPackman implementation, this selection sequence includes the portion of the compressed block that encodes at least one color component of the color codeword and the differential codeword, i.e. detects whether the sum of the color components of these two codewords exceeds the allowed property interval (overflows). However, as has been proved earlier, not the whole this sequence is required for the selection, but only a minimum portion thereof. Possible implementations of the overflow detector for packman are illustrated in FIGS. 10A and 10B. In a BTC [1], CCC [2], S3TC [3] or POOMA [5] implementation, the detector 400 preferably investigates the two (grey-scale or color) codewords in the compressed block, i.e. if they are equal the auxiliary decompressor 300 is selected, otherwise the default decompressor 200.

An optional image composer 120 could be provided in the decoder 100. This composer receives the decoded image elements from the block decoder 130 and composes them to generate a pixel that can be rendered or displayed on a screen. The composer 130 could require several input image elements to generate a single pixel. This image composer 130 could alternatively be provided in the graphic system.

The units 110, 120, 130, 140, 200, 300 and 400 of the image decoder 100 may be provided as software, hardware or a combination thereof. The units 110, 120, 130, 140, 200, 300 and 400 may be implemented together in the image decoder 100. Alternatively, a distributed implementation is also possible with some of the units provided elsewhere in the mobile unit.

In the decoder embodiment of FIG. 19, the image decoder 100 includes a single block decoder 130 having both default 200 and auxiliary 300 decompressors. In another embodiment, the image decoder 100 comprises multiple block decoders 130. By having access to multiple block decoders 130, the image decoder 100 can process (decode) multiple encoded image blocks in parallel. These multiple block decoders 130 allow for parallel processing that increases the processing performance and efficiency of the image decoder 100. For example, one decoded image element is generally sufficient for nearest neighbor interpolation, whereas four (eight) image element are need for bilinear (trilinear) interpolation. In such a case, each block decoder 100 can have both a default decompressor 200 and at least one auxiliary decompressor 300. Alternatively, a subset of the block decoders 130 can be equipped with a default decompressor 200, whereas a remaining block subset has (the same or different) auxiliary decompressors 300. In this embodiment, the detector 400 and representation selector 140 could advantageously be implemented in the image decoder 100.

FIG. 20 is an illustration of an embodiment of a default decompressor 200 adapted for the iPackman scheme. The default decompressor 200 comprises means 210 for providing intensity modifier sets from an associated intensity table 250 based on the intensity codewords. This provider 210 could be configured for fetching a first sub-set of modifier values from the intensity table 250 and determining a second sub-set of modifiers based on the first sub-set. A color generator 220 generates a single color representation for all image elements in the sub-block based on the color codeword or based on the color codeword and the color differential codeword. This generator 220 preferably expands the 15-bit color of the codeword into a 24-bit (RGB) color.

An intensity modifier selector 230 is arranged for selecting one of the intensity modifier values from the modifier sets provided by the means 210. The modifier selector 230 is configured for selecting correct modifier values for the image elements in the encoded image block based on the sequence of intensity indices. The expanded color from the color generator 120 and modifier value from modifier selector 130 are forwarded to an intensity modulator or modifier 140 that modifies the intensity of the color components of the expanded color with the modifier value. The modifier 140 could use a weighted intensity modifier value, with different weights for the different color components. Furthermore, once the color components have been intensity modified the modifier 140 preferably clamps the components between a maximum and minimum threshold, e.g. between 0 and 255.

The units 210, 220, 230 and 240 of the default decompressor 200 may be provided as software, hardware or a combination thereof. The units 210, 220, 230, 240 and 250 may be implemented together in the default decompressor 200. Alternatively, a distributed implementation is also possible with some of the units provided elsewhere in the image decoder.

FIG. 21 is an illustration of an embodiment of an auxiliary decompressor 300 adapted for the iPackman scheme. The decompressor 300 comprises a color generator 310 that generates four color representations based on the four color codeword. This generator 310 preferably expands the (11-bit) color of the codeword into a 24-bit (RGB) color.

A color selector 320 is arranged for selecting a color codeword or color representation to use for a subset of the image elements using the color index sequence. As a remaining subset of the image elements have a pre-defined associated color representation (codeword) that representation can simply be assigned to this (these) image element(s) without usage of the index sequence.

It is equivalent from decompressing point of view, whether four color representations are first generated based on the color codewords and a selection is performed among these based on the color indices, or if the selection is performed among the color codewords and the selected color codeword is then expanded to generate a color representation.

The units 310 and 320 of the auxiliary decompressor 300 may be provided as software, hardware or a combination thereof. The units 310 and 320 may be implemented together in the auxiliary decompressor 300. Alternatively, a distributed implementation is also possible with some of the units provided elsewhere in the image decoder.

FIG. 22 schematically illustrates a possible hardware implementation of the default block decompressor 200 adapted for the iPackman scheme. The input to the block decompressor 200 is an encoded block representation 900 comprising a 15-bit color codeword (5 bits for each of the red 912A, green 914A and blue 916A component), a 9-bit differential color codeword (3 bits for each of the red 922A, green 924A and blue 926A component), two 3-bit intensity codewords 930A, 940A, a 32-bit intensity index sequence 950A, a flipbit 960A and a diffbit 970A.

The color quantizer 220 is implemented as a set of multiplexors U 221A, 222, 223, a set of adders 224, 225, 226 and a set of bit extenders 227, 228, 229. This color quantizer 220 generates the base color for the two sub-blocks of the image block. For the first sub-block, this base color is obtained directly from the color codeword 912A, 914A, 916A, in which case multiplexors U 221, 222, 223 outputs zero. For the second sub-block, the multiplexors 221, 222, 223 output the respective color component 922A, 924A, 926A of the differential codeword that are added by the adders 224, 225, 226 to the color components 912A, 914A, 916A of the color codeword. The sign of components 922A, 924A, 926A of the differential codeword are preferably extended to six bits before the addition. For instance, if (R,G,B)=(4,15,27) and (ΔR,ΔG,ΔB)=(−4,−2,3), the resulting 15-bit color is (0,13, 30).

Thereafter, the bit extenders 227, 228, 229 extend the 5-bit value coming out of adders 224, 225, 226 to an 8-bit value. This can be done inexpensively by padding the missing lower order bits with the higher order bits. For instance, a five bit value $1101_{bin}$ will be converted to $10101101_{bin}$, and our five bit example above (0,13,30) will become (0,107,247).

The modifier selector 230 comprises two multiplexors 232, 234, where the first multiplexor V 232 selects which of the two intensity codewords 930A, 940A to employ for a particular image element and the second multiplexor 234 selects the intensity index of this image element. The 3-bit intensity codeword 930A, 940A is fed to the table look-up 215 that is an implementation of the modifier set provider 210 and intensity table 250. Using, for example, an intensity codeword of $011_{bin}$ means that the following modifier set is selected [−42,−13,13,42}], see Table 6 below.

describing which texel (image element) to decompress. The bits $w_3w_2$ contain the y-coordinate in the block, and $w_1w_0$ contain the x-coordinate.

U=diffbit AND V

V=flipbit AND $w_1$)OR(¬flipbit AND $w_3$), where ¬ is the NOT-operator.

FIG. 23 schematically illustrates a possible hardware implementation of the auxiliary block decompressor 300 adapted for the iPackman scheme. The input to the block decompressor 300 is an encoded block representation 900 comprising four 11-bit color codewords (4 bits for each of the red 912B, 922B, 932B, 942B and green 914B, 924B, 934B, 944B component and 3 bits for the blue components 916B, 926B, 936B, 946B), a 28-bit color index sequence 950B, a flipbit 960B, a diffbit 970B and the (4-bit) selection sequence 981 employed for identifying the compressed block 900 as processable by the auxiliary decoder 300. This auxiliary block decoder 300 will not employ the selection sequence 981 nor the diffbit 970B of the compressed block 900 for decoding purposes. Note that the actual bit layout of the compressed block 900 in FIG. 23 and also in FIG. 22 may differ from what is illustrated in the figures.

The color selector 320 of the decompressor 300 comprises two sets of multiplexors 321 to 329 and a single multiplexor

TABLE 6

| | | | Intensity codeword | | | | |
|---|---|---|---|---|---|---|---|
| $000_{bin}$ | $001_{bin}$ | $010_{bin}$ | $011_{bin}$ | $100_{bin}$ | $101_{bin}$ | $110_{bin}$ | $111_{bin}$ |
| −8 | −17 | −29 | −42 | −60 | −80 | −106 | −183 |
| −2 | −5 | −9 | −13 | −18 | −24 | −33 | −47 |
| 2 | 5 | 9 | 13 | 18 | 24 | 33 | 47 |
| 8 | 17 | 29 | 42 | 60 | 80 | 106 | 183 |

Table 6 consists of eight different intensity modifier set, each containing four modifier values. The table was generated by starting from random numbers and then optimizing them by minimizing the error for a set of training images. Note that the first and second values of each modifier are preferably the third and fourth values negated. Thus, only sixteen of the numbers need to be stored, and the remaining 16 values can be obtained therefrom.

The multiplexor 234 uses four input bits (address index) to select which image element to decompress. The resulting 2-bit intensity index is forwarded to the table look-up 215, which selects a specific modifier value from the selected modifier set of four numbers. For instance, if the pixel index is $11_{bin}$, using the modifier set selected above, the modifier value is −42.

Finally, the intensity modifier 240, implemented as three adders 241, 242, 243 and dampers 244, 245, 246, generate the resulting decompressed color value for the image element. The adders 241, 242, 243 add the modifier value from the table look-up to the expanded base color from the bit extenders 227, 228, 229. Then the color is clamped between a maximum allowed color value, e.g. 0, and a maximum allowed color value, e.g. 255. For the example above, we will get (0,107,247)+(42,42,42)=(42,149,255), where values have been clamped to [0,255].

The multiplexors 221, 222, 223, 232 marked with U and V are operated by signals U and V from the control logic 260. The control logic 260 takes the input parameters diffbit, flipbit, and w=$w_3w_2w_1w_0$, where w are 4-bit address index

330. The multiplexor 330 selects color index for the image element to be decoded. This index selection is based on the address index of the image element. Note that for one of the image elements per sub-block, there is a pre-defined codeword associated so no color index is found in the index sequence 950B for this image element. If that image element is to be decoded, as determined by the address index, the multiplexor 330 outputs the pre-defined value of $0_{bin}$ (or $1_{bin}$).

The output X from the control logic 340 is used by the first set of multiplexors X 321 to 326 in order to selected between the first 912B, 914B, 916B and third 932B, 934B, 936B color codeword and between the second 922B, 924B, 926B and fourth 942B, 944B, 946B color codeword. This basically corresponds to selecting between the two sub-blocks since the first 912B, 914B, 916B and second 922B, 924B, 926B color codeword are dedicated for the first sub-block and the third 932B, 934B, 936B and fourth 942B, 944B, 946B color codeword are applicable for the second sub-block. The subsequence selection of color codewords (within a sub-block), i.e. between the first 912B, 914B, 916B and second 922B, 924B, 926B color codeword and the third 932B, 934B, 936B and fourth 942B, 944B, 946B color codeword, respectively, is done by the second set of multiplexors W based on the output W from the multiplexor 300.

The color components of the finally selected color codeword are forwarded to the bit extenders 311, 312, 313 of the color generator 310. These bit extenders 311, 312, 313 extends the 4-bit or 3-bit color components to 8-bit color components, preferably by repeating the bit pattern of the color components, e.g. $101_{bin}$ ($101_{bin}$) is extended into 1011 $0110_{bin}$ (1011 $1011_{bin}$).

The multiplexors 321 to 326 marked with X are operated by signals X from the control logic 340. The control logic 340 takes the input parameters flipbit, and $w=w_3w_2w_1w_0$, where w are 4-bit address index describing which texel to decompress. The bits $w_3w_2$ contain the y-coordinate in the block, and $w_1w_0$ contain the x-coordinate.

X==(flipbit AND $w_1$)OR(¬flipbit AND $w_3$), where ¬is the NOT-operator.

It will be understood by a person skilled in the art that various modifications and changes may be made to the present invention without departure from the scope thereof, which is defined by the appended claims.

REFERENCES

[1] Delp., Mitchell: Image Compression using Block Truncation Coding. *IEEE Transactions on Communications* 2, 9 (1979), 1335-1342.
[2] Campbell, Defant, Frederiksen, Joyce, Leske, Lindberg, Sandin: Two Bit/Pixel Full Color Encoding. In *Proceedings of SIGGRAPH* (1986), vol. 22, pp. 215-223.
[3] U.S. Pat. No. 5,956,431.
[4] McCabe, Brothers: DirectX 6 Texture Map Compression. *Game Developer Magazine* 5, 8 (August 1998), 42-46.
[5] Akenine-Möller, Ström: Graphics for the Masses: A Hardware Rasterization Architecture for Mobile Phones. *ACM Transactions on Graphics*, 22, 3 (2003), 801-808.
[6] Fenney: Texture Compression using Low-Frequency Signal Modulation. *In Graphics Hardware* (2003), ACM Press, pp. 84-91.
[7] International application no. PCT/SE2004/001922
[8] Swedish patent application no. 0303497-2
[9] International application no. PCT/SE2004/001120
[10] Ström, Akenine-Möller: PACKMAN: Texture Compression for Mobile Phones. In *Sketches program at SIGGRAPH* (2004).

The invention claimed is:

1. A method of processing a compressed representation of an image block comprising multiple image elements, said method comprising the steps of:
   detecting a compressed representation that is not adapted for being processed by a default processing mode based on a selection portion of said compressed representation, said detected compressed representation comprising a bit sequence representing a redundant bit combination or a meaningless bit combination when processed according to said default processing mode; and
   generating a decompressed representation of at least a portion of said image block by processing a first auxiliary payload portion of said compressed representation according to a first auxiliary processing mode, said first auxiliary payload portion being smaller than a corresponding default payload portion of said compressed representation employed when processing said compressed representation according to said default processing mode, wherein said first auxiliary processing mode processes bit combinations representing redundant bit combinations or meaningless bit combinations for said default processing mode.

2. A method of processing a compressed representation of an image block comprising multiple image elements, said compressed representation comprising a bit sequence, said method comprises the steps of:
   generating a decompressed representation of at least a portion of said image block by processing a first auxiliary payload portion of said compressed representation according to a first auxiliary processing mode;
   generating a decompressed representation of said at least a portion of said image block by processing a default payload portion of said compressed representation according to a default processing mode, said default payload portion being larger than said first auxiliary payload portion; and
   selecting, based on a selection portion of said compressed representation, between said decompressed representation generated according to said auxiliary processing mode and said decompressed representation generated according to said default processing mode, wherein said first auxiliary processing mode processes bit combinations representing redundant bit combinations or meaningless bit combinations for said default processing mode.

3. The method according to claim 2, wherein said default payload portion comprises said first auxiliary payload portion and said selection portion.

4. The method according to claim 2, wherein said selection portion represents at least one of:
   a first and a second codeword used, in said default processing mode, for representing a same image element associated property;
   a sub-sequence of said first and second codeword used, in said default processing mode, for representing said same image element associated property; and
   an index sequence used, in said default processing mode, for representing multiple image element associated indices.

5. The method according to claim 4, wherein the detecting step further comprises at least one of the steps of:
   detecting said compressed representation as not adapted for said default processing mode by detecting that a sum representation of said first and second codeword will be outside of a property interval allowable according to said default processing mode;
   detecting said compressed representation as not adapted for said default processing mode if said first codeword is equal to said second codeword; and
   detecting said compressed representation as not adapted for said default processing mode if said indices of said index sequence are equal.

6. The method according to claim 4, wherein said selecting step further comprises at least one of the steps of:
   selecting said decompressed representation generated according to said first auxiliary processing mode by detecting that a sum representation of said first and second codeword is outside of a property interval allowable according to said default processing mode;
   selecting said decompressed representation generated according to said first auxiliary processing mode if said first codeword is equal to said second codeword; and
   selecting said decompressed representation generated according to said first auxiliary processing mode if said indices of said index sequence are equal.

7. The method according to claim 2, wherein said default payload portion of said compressed representation is interpreted, according to said default processing mode, as comprising a first and a second color codeword, a first and a second intensity codeword and an intensity index sequence, and said default processing mode comprising the steps of:

providing a set of multiple intensity modifiers based on said first or second intensity codeword;

for at least one image element in said image block:
  generating a color representation based on said first color codeword or a sum of said first and second color codeword;
  selecting an intensity modifier from said intensity modifier set based on said intensity index sequence; and
  modifying the intensity of said at least one image element based on said selected intensity modifier.

8. The method according to claim 2, wherein said first auxiliary payload portion of said compressed representation is interpreted, according to said first auxiliary processing mode, as comprising a first, a second, a third and a fourth color codeword and a color index sequence, and said at least one auxiliary processing mode comprising the steps of:
  generating a color representation based on at least one color codeword selected from said first, second, third and fourth color codeword.

9. The method according to claim 8, wherein said color index sequence comprises, for each image element in a first subset of said multiple image elements, a color index associated with said first or second color codeword, each image element in a second subset of said multiple image elements is associated with a pre-defined color codeword selected from said first or second color codeword, and said color index sequence comprises, for each image element in a third subset of said multiple image elements, a color index associated with said third or fourth color codeword, each image element in a fourth remaining subset of said multiple image elements is associated with a pre-defined color codeword selected from said third or fourth color codeword.

10. The method according to claim 2, wherein said selection portion represents, when processed according to said default processing mode, a sequence of first and a second codeword representing a first component of a same image element associated property and said compressed representation comprises a second selection portion representing, when processed according to said default processing mode, a sequence of a third and a fourth codeword used, in said default processing mode, for representing a second component of said same image element associated property, and a data sequence.

11. The method according to claim 10, further comprising the step of selecting between said first auxiliary processing mode and a second auxiliary processing mode based on said sequence of said first and second codeword or based on said sequence of said first and second codeword and said sequence of said third and fourth codeword, said second auxiliary processing mode is adapted for processing a second auxiliary payload portion of said compressed representation, said second auxiliary payload portion being smaller than said first auxiliary payload portion.

12. The method according to claim 1, further comprising the step of generating a decompressed representation of said at least a portion of said image block by processing a second auxiliary payload portion of said compressed representation according to a second auxiliary processing mode, said second auxiliary payload portion being smaller than said first auxiliary payload portion, wherein said selecting step comprises the step of selecting said decompressed representation generated according to said default processing mode, said decompressed representation generated according to said first auxiliary processing mode and said decompressed representation generated according to said second auxiliary processing mode based on said sequence of said first and second codeword or based on said sequence of said first and second codeword and said sequence of said third and fourth codeword.

13. The method according to claim 10, wherein said compressed representation comprises a third selection portion representing, when processed according to said default processing mode, a sequence of a fifth and a sixth codeword used, in said default processing mode, for representing a third component of said same image element associated property.

14. The method according to claim 13, further comprising the step of selecting between said first auxiliary processing mode, said second auxiliary processing mode and a third auxiliary based on said sequence of said first and second codeword, based on said sequence of said first and second codeword and said sequence of said third and fourth codeword, or based on said sequence of said first and second codeword, said sequence of said third and fourth codeword and said sequence of said fifth and sixth codeword.

15. The method according to claim 13, further comprising the step of generating a decompressed representation of said at least a portion of said image block by processing a third auxiliary payload portion of said compressed representation according to a third auxiliary processing mode, said third auxiliary payload portion being smaller than said second auxiliary payload portion, wherein said selecting step comprises the step of selecting said decompressed representation generated according to said default processing mode, said decompressed representation generated according to said first auxiliary processing mode, said decompressed representation generated according to said second auxiliary processing mode and said decompressed representation generated according to said third auxiliary processing mode based on said sequence of said first and second codeword, based on said sequence of said first and second codeword and said sequence of said third and fourth codeword, or based on said sequence of said first and second codeword, said sequence of said third and fourth codeword and said sequence of said fifth and sixth codeword.

16. A method of generating a compressed representation of an image block comprising multiple image elements, said compressed representation comprising a bit sequence, said method comprising the steps of:
  generating a default compressed representation of said image block by compressing said image block according to a default compressing mode, said default compressed representation comprises a default payload portion for representing said image block;
  calculating a first error representation indicative of representing said image block with said default compressed representation;
  generating at least one auxiliary compressed representation of said image block by compressing said image block according to at least one auxiliary compressing mode, said at least one auxiliary compressed representation comprises an auxiliary payload portion for representing said image block, said auxiliary payload portion being smaller than said default payload portion, said at least one auxiliary compressing mode generates, as said at least one auxiliary compressed representation bit combinations representing redundant bit combinations or meaningless bit combinations for said default compressing mode;
  calculating at least a second error representation indicative of representing said image block with said at least one auxiliary compressed representation: and
  selecting a compressed representation associated with a smallest error representation from said default and said at least one auxiliary compressed representation, wherein a selection portion of said selected compressed representation indicates the compressing mode employed for generating said compressed representation.

17. The method according to claim 16, wherein said step of generating said default compressed representation comprises the steps of:
determining a first and second color codeword that are representations of the colors of said image elements in said image block;
providing a first and a second intensity codeword that are a representation of sets of multiple intensity modifiers for modifying the intensity of said image elements in said image block; and
selecting, for each image element in said image block, an intensity index associated with an intensity modifier from said intensity modifier sets.

18. The method according to claim 16, wherein said step of generating said at least one auxiliary compressed representation comprises the steps of:
determining a first, second, third and fourth color codeword that are representations of the colors of said image elements in said image block; and
selecting, for each image element in at least subset of said multiple image elements, a color associated with a color codeword selected from said first, second, third and fourth color codeword.

19. A method of generating a compressed representation of an image block comprising multiple image elements, said compressed representation comprising a bit sequence, said method comprising the steps of:
selecting a compressing mode from a default compressing mode and an auxiliary compressing mode based on an investigation of properties of said image elements in said image block;
generating said compressed representation by compressing said image block according to said selected compressing mode, wherein said default compressing mode generates a default compressed representation comprising a default payload portion for representing said image block and said auxiliary compressing mode generates an auxiliary compressed representation comprising an auxiliary payload portion for representing said image block, said auxiliary payload portion being smaller than said default payload portion, said auxiliary compressing mode generates, as said auxiliary compressed representation, bit combinations representing redundant bit combinations or meaningless bit combinations for said default compressing mode; and
setting a selection portion of said compressed representation to indicate said selected compressing mode.

20. The method according to claim 19, wherein said default payload portion comprises said auxiliary payload portion and said selection portion.

21. The method according to claim 19, wherein said selection portion represents at least one of:
a first and a second codeword used, in said default processing mode, for representing a same image element associated property;
a sub-sequence of said first and second codeword used, in said default processing mode, for representing said same image element associated property; and
an index sequence used, in said default processing mode, for representing multiple image element associated indices.

22. The method according to claim 21, wherein a representation of a sum of said first and second codeword is within an allowable property interval if said selected compressed representation is generated according to said default compressing mode and said sum representation exceeds said allowable property interval if said selected compressed representation is generated according to said at least one auxiliary compressing mode.

23. A system for processing a compressed representation of an image block comprising multiple image elements, said system comprising:
a detector adapted to detect a compressed representation that is not adapted for being processed by a default decoder based on a selection portion of said compressed representation, said detected compressed representation comprising a bit sequence representing a redundant bit combination or a meaningless bit combination when processed by said default decoder; and
an auxiliary decoder adapted to generate a decompressed representation of at least a portion of said image block by processing a first auxiliary payload portion of said compressed representation according to a first auxiliary processing mode, said first auxiliary payload portion being smaller than a corresponding default payload portion of said compressed representation employed when a default decoder processes said compressed representation according to said default processing mode, wherein said auxiliary decoder processes bit combinations representing redundant bit combinations or meaningless bit combinations for said default decoder.

24. A system for processing a compressed representation of an image block comprising multiple image elements, said compressed representation comprising a bit sequence, said system comprising:
a default decoder adapted to generate a decompressed representation of at least a portion of said image block by processing a default payload portion of said compressed representation according to a default processing mode;
an auxiliary decoder adapted to generate a decompressed representation of said at least a portion of said image block by processing a first auxiliary payload portion of said compressed representation according to a first auxiliary processing mode, said first auxiliary payload portion being smaller than said default payload portion; and
a selector adapted to select, based on a first portion of said compressed representation, between said decompressed representation generated by said default decoder and said decompressed representation generated by said auxiliary decoder wherein said auxiliary decoder processes bit combinations representing redundant bit combinations or meaningless bit combinations for said default decoder.

25. The system according to claim 24, wherein said default payload portion comprises said first auxiliary payload portion and said selection portion.

26. The system according to claim 24, wherein the selection portion represents at least one of:
a first and a second codeword used, when processed by said default decoder, for representing a same image element associated property;
a sub-sequence of said first and second codeword used, when processed by said default decoder, for representing said same image element associated property; and
an index sequence used, when processed by said default decoder, for representing multiple image element associated indices.

27. The system according to claim 26, wherein said detector is configured for performing at least one of:
- detecting said compressed representation as not adapted for said default decoder by detecting that a sum representation of said first and second codeword will be outside of a property interval;
- detecting said compressed representation as not adapted for said default decoder if said first codeword is equal to said second codeword; and
- detecting said compressed representation as not adapted for said default decoder if said indices of said index sequence are equal.

28. The system according to claim 26, wherein said selector is configured to perform at least one of the following operations:
- select said decompressed representation generated by said auxiliary decoder by detecting that a sum representation of said first and second codeword will be outside of a property interval;
- select said decompressed representation generated by said auxiliary decoder if said first codeword is equal to said second codeword; and
- select said decompressed representation generated by said auxiliary decoder if said indices of said index sequence are equal.

29. The system according to claim 24, wherein said default payload portion of said compressed representation is interpreted, by said default decoder, as comprising a first and a second color codeword, a first and a second intensity codeword and an intensity index sequence, and said default decoder further comprises:
- means for providing a set of multiple intensity modifiers based on said first or second intensity codeword;
- means for generating, for at least one image element in said image block, a color representation based on said first color codeword or a sum of said first and second color codeword;
- a selector for selecting an intensity modifier from said intensity modifier set based on said intensity index sequence; and
- a modifier for modifying the intensity of said at least one image element based on said selected intensity modifier.

30. The system according to claim 24, wherein said first auxiliary payload portion of said compressed representation is interpreted, by said auxiliary decoder, as comprising a first, a second, a third and a fourth color codeword and a color index sequence, and said default decoder comprises means for generating a color representation based on at least one color codeword selected from said first, second, third and fourth color codeword.

31. The system according to claim 24, wherein said selection portion represents, when processed by said default decoder, a sequence of first and a second codeword used, when processed by said default decoder, for representing a first component of a same image element associated property and said compressed representation comprises a second selection portion representing, when processed according to said default processing mode, a sequence, a third and a fourth codeword used, when processed by said default decoder, for representing a second component of said same image element associated property, and a data sequence.

32. The system according to claim 31, further comprising a selector for selecting between said first auxiliary processing mode and a second auxiliary processing mode based on said sequence of said first and second codeword or based on said sequence of said first and second codeword and said sequence of said third and fourth codeword, wherein said auxiliary decoder processes said compressed representation according to the auxiliary processing mode selected by said selector.

33. The system according to claim 32, wherein said default decoder is configured for generating a decompressed representation of said at least a portion of said image block by processing a second auxiliary payload portion of said compressed representation according to a second auxiliary processing mode, said second auxiliary payload portion being smaller than said first auxiliary payload portion, wherein said selector is configured for selecting said decompressed representation generated by said default decoder, said decompressed representation generated by said auxiliary decoder according to said first auxiliary processing mode and said decompressed representation generated by said auxiliary decoder according to said second auxiliary processing mode based on said sequence of said first and second codeword or based on said sequence of said first and second codeword and said sequence of said third and fourth codeword.

34. The system according to claim 31, wherein said compressed representation comprises a third selection portion representing, when processed by said default decoder, a sequence of fifth and a sixth codeword used, when processed by said default decoder, for representing a third component of said same image element associated property.

35. The system according to claim 34, further comprising a selector adapted to select between said first auxiliary processing mode, said second auxiliary processing mode and a third auxiliary based on said sequence of said first and second codeword, based on said sequence of said first and second codeword and said sequence of said third and fourth codeword, or based on said sequence of said first and second codeword, said sequence of said third and fourth codeword and said sequence of said fifth and sixth codeword.

36. The system according to claim 34, wherein said default decoder is configured to generate a decompressed representation of said at least a portion of said image block by processing a third auxiliary payload portion of said compressed representation according to a third auxiliary processing mode, said third auxiliary payload portion being smaller than said second payload portion, wherein said selector is configured to select said decompressed representation generated by said default decoder, said decompressed representation generated by said auxiliary decoder according to said first auxiliary processing mode, said decompressed representation generated by said auxiliary decoder according to said second auxiliary processing mode and said decompressed representation generated by said auxiliary decoder according to said third auxiliary processing mode based on said sequence of said first and second codeword, based on said sequence of said first and second codeword and said sequence of said third and fourth codeword, or based on said sequence of said first and second codeword, said sequence of said third and fourth codeword and said sequence of said fifth and sixth codeword.

37. A system for generating a compressed representation of an image block comprising multiple image elements, said compressed representation comprising a bit sequence, said system comprises:
- a default encoder adapted to generate a default compressed representation of said image block by compressing said image block according to a default compressing mode, said default compressed representation comprises a default payload portion for representing said image block;
- means for calculating a first error representation indicative of representing said image block with said default compressed representation;

an auxiliary encoder for generating at least one auxiliary compressed representation of said image block by compressing said image block according to at least one auxiliary compressing mode, said at least one auxiliary compressed representation further comprising a first auxiliary payload portion for representing said image block, said first auxiliary payload portion being smaller than said default payload portion, said auxiliary encoder adapted to generate, as said at least one auxiliary compressed representation, bit combinations representing redundant bit combinations or meaningless bit combinations for said default encoder;

means for calculating at least one second error representation indicative of representing said image block with said at least one auxiliary compressed representation; and a selector adapted to select a compressed representation associated with a smallest error representation from said default and said at least one auxiliary compressed representation, wherein a selection portion of said selected compressed representation indicates the compressing mode employed for generating said compressed representation.

38. A system for generating a compressed representation of an image block comprising multiple image elements, said compressed representation comprising a bit sequence, said system comprises:

an encoder selector adapted to select a block encoder from a default encoder and an auxiliary encoder based on an investigation of properties of said image elements in said image block;

said default encoder adapted for generating a default compressed representation of said image block by compressing said image block according to a default compressing mode, said default compressed representation comprises a default payload portion for representing said image block;

said auxiliary encoder adapted for generating an auxiliary compressed representation of said image block by compressing said image block according to an auxiliary compressing mode, said auxiliary compressed representation further comprising an auxiliary payload portion for representing said image block, said auxiliary payload portion being smaller than said default payload portion, said auxiliary encoder adapted to generate, as said auxiliary compressed representation, bit combinations representing redundant bit combinations or meaningless bit combinations for said default encoder; and means for setting a selection portion of said compressed representation to indicate said selected block encoder.

39. The system according to claim 38, wherein said default payload portion comprises said auxiliary payload portion and said selection portion.

40. The system according to claim 38, wherein said selection portion represents at least one of:

a first and a second codeword used, when processed by said default encoder, for representing a same image element associated property;

a sub-sequence of said first and second codeword used, when processed by said default encoder, for representing said same image element associated property; and an index sequence used, when processed by said default encoder, for representing multiple image element associated indices.

41. The system according to claim 40, wherein a representation of a sum of said first and second codeword is within an allowable property interval if said selected compressed representation is generated by said default encoder and said sum representation exceeds said allowable property interval if said selected compressed representation is generated by said auxiliary encoder.

42. The system according to claim 38, wherein said default encoder comprises:

means for determining a first and second color codeword that are representations of the colors of said image elements in said image block;

means for providing a first and a second intensity codeword that are a representation of sets of multiple intensity modifiers for modifying the intensity of said image elements in said image block; and a selector adapted to select, for each image element in said image block, an intensity index associated with an intensity modifier from said intensity modifier sets.

43. The system according to claim 38, wherein said auxiliary encoder comprises:

means for determining a first, second, third and fourth color codeword that are representations of the colors of said image elements in said image block; and a selector adapted to select, for each image element in at least subset of said multiple image elements, a color associated with a color codeword selected from said first, second, third and fourth color codeword.

44. The system of claim 38, as embodied in a user terminal.

* * * * *

UNITED STATES PATENT AND TRADEMARK OFFICE
CERTIFICATE OF CORRECTION

PATENT NO. : 7,751,630 B2  Page 1 of 1
APPLICATION NO. : 11/571806
DATED : July 6, 2010
INVENTOR(S) : Strom et al.

It is certified that error appears in the above-identified patent and that said Letters Patent is hereby corrected as shown below:

In Column 5, Line 56, delete "FIG. 301" and insert -- FIG. 1 --, therefor.

In Column 7, Line 27, delete "QCC" and insert -- CCC --, therefor.

In Column 11, Line 12, delete "Packman-CCC" and insert -- iPackman-CCC --, therefor.

In Column 13, Line 51, delete "Packman," and insert -- iPackman, --, therefor.

In Column 13, Line 54, delete "Packman" and insert -- iPackman --, therefor.

In Column 16, Line 44, delete "94013" and insert -- 940B --, therefor.

In Column 27, Line 17, delete "packman" and insert -- iPackman --, therefor.

In Column 32, Line 28, delete "texture," and insert -- texture --, therefor.

In Column 32, Line 48, delete "on" and insert -- of) --, therefor.

In Column 32, Line 57, delete "decompressor;" and insert -- decompressor, --, therefor.

In Column 33, Line 20, delete "packman" and insert -- iPackman --, therefor.

In Column 35, Line 55, delete "dampers" and insert -- clampers --, therefor.

In Column 36, Line 6, delete "V=flipbit" and insert -- V=(flipbit --, therefor.

In Column 37, Line 11, delete "X==(flipbit" and insert -- X=(flipbit --, therefor.

In Column 37, Line 39, delete "PACKMAN:" and insert -- iPACKMAN: --, therefor.

In Column 40, Line 65, in Claim 16, delete "representation:" and insert -- representation; --, therefor.

Signed and Sealed this

Twelfth Day of October, 2010

David J. Kappos
*Director of the United States Patent and Trademark Office*